US009168804B2

(12) United States Patent
Brookes et al.

(10) Patent No.: US 9,168,804 B2
(45) Date of Patent: Oct. 27, 2015

(54) END MEMBERS, GAS SPRING ASSEMBLIES AND SUSPENSION SYSTEMS

(71) Applicant: Firestone Industrial Products Company, LLC, Indianapolis, IN (US)

(72) Inventors: Graham R. Brookes, Carmel, IN (US); Joshua R. Leonard, Noblesville, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 14/101,267

(22) Filed: Dec. 9, 2013

(65) Prior Publication Data

US 2014/0091505 A1 Apr. 3, 2014

Related U.S. Application Data

(63) Continuation-in-part of application No. 11/650,819, filed on Jan. 8, 2007, now Pat. No. 8,602,399.

(51) Int. Cl.
*B60G 15/08* (2006.01)
*F16F 9/05* (2006.01)
*F16F 9/32* (2006.01)
*G01S 15/08* (2006.01)
*G01S 15/88* (2006.01)
*G01S 7/521* (2006.01)

(52) U.S. Cl.
CPC . *B60G 15/08* (2013.01); *F16F 9/05* (2013.01); *F16F 9/3292* (2013.01); *G01S 7/521* (2013.01); *G01S 15/08* (2013.01); *G01S 15/88* (2013.01)

(58) Field of Classification Search
CPC .......... B60G 15/08; F16F 9/05; F16F 9/3292; G01S 7/521
USPC ............... 267/64.11, 64.19, 64.24, 64.27
See application file for complete search history.

(56) References Cited

U.S. PATENT DOCUMENTS

| 4,532,916 | A | * | 8/1985 | Aharon ......................... 126/600 |
| 4,798,369 | A | * | 1/1989 | Geno et al. ................. 267/64.11 |
| 5,382,006 | A | * | 1/1995 | Arnold ....................... 267/64.27 |
| 5,936,161 | A | * | 8/1999 | Fischer ........................... 73/632 |
| 6,070,861 | A | * | 6/2000 | Ecktman ......................... 60/778 |
| 6,073,491 | A | * | 6/2000 | Fischer et al. ................. 73/629 |
| 6,109,598 | A | * | 8/2000 | Hilburger et al. .......... 267/64.24 |
| 6,113,081 | A | * | 9/2000 | Hilburger et al. .......... 267/64.27 |
| 6,637,269 | B2 | * | 10/2003 | Reck et al. ...................... 73/627 |
| 6,931,930 | B2 | * | 8/2005 | Reck ............................... 73/597 |

* cited by examiner

*Primary Examiner* — Xuan Lan Nguyen
(74) *Attorney, Agent, or Firm* — Jason A. Houser; Fay Sharpe LLP

(57) ABSTRACT

An end member for a gas spring assembly can include a first end, a second end opposite the first end and a plurality of reflector surfaces formed along the first end. A first reflector surface can extend from the first end toward the second end. A second reflector surface can extend from adjacent the first reflector surface toward the second end. One or more of the plurality of reflector surfaces can include a plurality of facets or reflector zones. A gas spring assembly including at least one of such end members and a suspension system including one or more of such gas spring assemblies are also disclosed.

21 Claims, 14 Drawing Sheets

END MEMBERS, GAS SPRING ASSEMBLIES AND SUSPENSION SYSTEMS

This application is a continuation-in-part of U.S. patent application Ser. No. 11/650,819, filed on Jan. 8, 2007, now U.S. Pat. No. 8,602,399, the contents of which is hereby incorporated herein by reference in its entirety.

BACKGROUND

The subject matter of the present disclosure broadly relates to the art of vehicle suspension systems and, more particularly, to end members including multiple reflecting surfaces for use with an associated sensing device as well as gas spring assemblies including such end members and suspension systems including one of more of such gas spring assemblies.

The subject matter of the present disclosure finds particular application and use in conjunction with suspension systems of wheeled vehicles, and will be shown and described herein with reference thereto. However, it is to be appreciated that the subject matter of the present disclosure is also amenable to other applications and environments, and that the specific uses shown and described herein are merely exemplary. For example, the subject matter of the present disclosure could be used in support structures, height adjusting systems and actuators associated with industrial machinery, components thereof and/or other such equipment. Accordingly, the subject matter of the present disclosure is not intended to be limited to use associated with vehicle suspensions.

Gas suspension systems for vehicles are known to provide the capability of adjusting the height and/or alignment (i.e., leveling) of the sprung mass (e.g., a body or chassis) of a vehicle relative to the unsprung mass (e.g., a wheel-engaging feature or axle housing) thereof. To enable gas spring assemblies of the gas suspension system to be suitably adjusted to a desired height or alignment, height sensing devices are commonly used in association therewith. As such, a wide variety of height sensing devices are known to be used in association with vehicle suspension systems, such as mechanically-linked potentiometers and magnetic proximity/position sensors, for example.

Another type of height sensor that is commonly used in association with vehicle suspension systems operates by sending and receiving ultrasonic waves. Typically, the ultrasonic sensor will broadcast a series of ultrasonic waves toward a target area that is suitable for reflecting the waves back to or toward the sensor, which typically also receives the reflected waves. In some cases, a duration of time required for the ultrasonic waves to travel to the target area and back can be used to calculate or otherwise determine the distance traveled, which can be related to the height of the gas spring or other associated components.

One difficulty with the use of known ultrasonic sensing systems involves the direction in which the reflected waves travel. That is, an ultrasonic sensor or sensing device will normally include an ultrasonic wave transmitting portion and an ultrasonic wave receiving portion. While these two portions can be mounted separately and/or apart from one another, in many constructions the transmitting and receiving portions are mounted within a common housing. As such, it is desirable for the ultrasonic waves to be reflected, from their origin at the sensing device, more or less directly back to the sensing device to be received by the receiving portion.

The foregoing operational constraint is normally not problematic in suspension systems in which the target area moves in relative alignment to or with the sensing device. However, in some suspension systems the target area may move in and out of alignment or otherwise become misaligned with the sensing device. Under such operating conditions, the orientation and/or alignment of the target area may be misaligned with the sensing device. Thus, the ultrasonic waves may not be reflected back toward the ultrasonic wave receiving portion of the sensing device. In some cases, such conditions can lead to the ultrasonic waves not being received by the sensing portion of the sensing device, which can, in turn, result in unreliable output by the ultrasonic height sensing device or even a lack of operation of the ultrasonic height sensing system for the duration of the misalignment or at least a portion thereof.

Accordingly, it is believed desirable to develop a reflector for a gas spring assembly that is capable of improving the operation and performance of ultrasonic height sensing systems and/or is otherwise adapted to overcome the foregoing and/or other disadvantages of known constructions while comparable or improved performance, promoting relatively low costs of manufacture, ease of assembly, ease of installation and/or otherwise advancing the art of gas spring devices and suspension systems including the same.

BRIEF SUMMARY

One example of a reflector in accordance with the subject matter of the present disclosure can be used in connection with an associated gas spring assembly. The reflector can be capable of reflecting associated sensing waves toward an associated sensing device in a plurality of aligned conditions relative to the associated sensing device. The reflector can include a first end surface and a second end surface that is spaced from the first end surface. A first reflecting area can extend from approximately the first end surface at a first included angle. A second reflecting area can extend from approximately the first reflecting area at a second included angle that is different from the first included angle.

One example of an end member in accordance with the subject matter of the present disclosure can be dimensioned for securement to an associate flexible spring member to form an associated gas spring assembly. The end member can include a first end and a second end that is spaced apart from the first end such that a longitudinal axis is formed therebetween. A first reflecting area can extend radially outward along the first end at a first included angle. A second reflecting area can extending radially outward along the first end from adjacent the first reflecting area at a second included angle that is different from the first included angle such that an intersection is formed therebetween. At least one of the first reflecting area and the second reflecting area can be faceted such that the at least one of the first reflecting area and the second reflecting area includes a plurality of reflecting surfaces circumferentially distributed about the longitudinal axis.

One example of a gas spring assembly in accordance with the subject matter of the present disclosure can be use with an associated sensor that is capable of transmitting and receiving associated sensing waves. The gas spring assembly can include a first end member and a second end member spaced from the first end member. A flexible spring member can be secured between the first and second end members and can at least partially define a spring chamber therebetween. A reflector can be supported within the spring chamber and can include a first end surface and a second end surface that is spaced from the first end surface. A first reflecting surface can extend from adjacent the first end surface at a first included angle. A second reflecting surface can extend from adjacent the first reflecting surface at a second included angle. Under a first aligned condition of the reflector, the first end surface can be aligned approximately transverse to a direction of transmission of the associated sensing waves. Under a second aligned condition of the reflector one of the first and second reflecting surfaces can be aligned approximately transverse to the direction of transmission.

Another example of a gas spring assembly in accordance with the subject matter of the present disclosure can be used on an associated vehicle between an associated sprung mass and an associated unsprung mass thereof. The gas spring assembly can include an upper end member operatively connected to the associated sprung mass, and a lower end member spaced from the upper end member and operatively connected to the associated unsprung mass. A flexible spring member can be secured between the upper and lower end members and can at least partially define a spring chamber therebetween. A sensor can be operable for transmitting and receiving sensing waves within the spring chamber. The sensor can be supported along one of the upper and lower end members. A reflector can be supported within the spring chamber on the other of the upper and lower end members and can be capable of reflecting the sensing waves. The reflector can include a top surface and a bottom surface that is spaced from the top surface. A first reflecting surface can extend from adjacent the top surface at a first included angle. A second reflecting surface can extend from adjacent the first reflecting surface at a second included angle.

A further example of a gas spring assembly in accordance with the subject matter of the present disclosure can include a flexible spring member having a longitudinal axis. The flexible spring member can extend longitudinally between opposing first and second ends and peripherally about the axis to at least partially define a spring chamber. A first end member can be disposed across the first end of the flexible spring member and can be secured thereto such that a substantially fluid-tight seal is formed therebetween. A second end member can be spaced from the first end member and disposed across the second end of the flexible spring member. The second end member can be secured to the second end of the flexible spring member such that a substantially fluid-tight seal is formed therebetween. The second end member can extend longitudinally between a first end and a second end that is spaced apart from the first end. The second end member can include a first reflecting area that can extend radially outward along the first end of the second end member at a first included angle. A second reflecting area can extend radially outward along the first end of the second end member from adjacent the first reflecting area at a second included angle that is different from the first included angle such that an intersection is formed therebetween. At least one of the first reflecting area and the second reflecting area can be faceted such that the at least one of the first reflecting area and the second reflecting area includes a plurality of reflecting surfaces circumferentially distributed about the longitudinal axis. A sensor can be disposed within the spring chamber and can be secured along the first end member. The sensor can be operative to transmit sensing waves toward and/or receive sensing waves reflected from at least one of the first reflecting area and the second reflecting area of the second end member.

One example of suspension system in accordance with the subject matter of the present disclosure can include at least one gas spring assembly according to any one or more of the foregoing three paragraphs. A pressurized gas system can include a pressurized gas source and a control device. The pressurized gas source can be in fluid communication with the at least one gas spring assembly through the control device. A control system can be communicatively coupled with at least the control device and can be operative to selectively transfer pressurized gas into and out of the at least one gas spring assembly through the control device.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purpose of clarity and ease of understanding.

Figure 1:
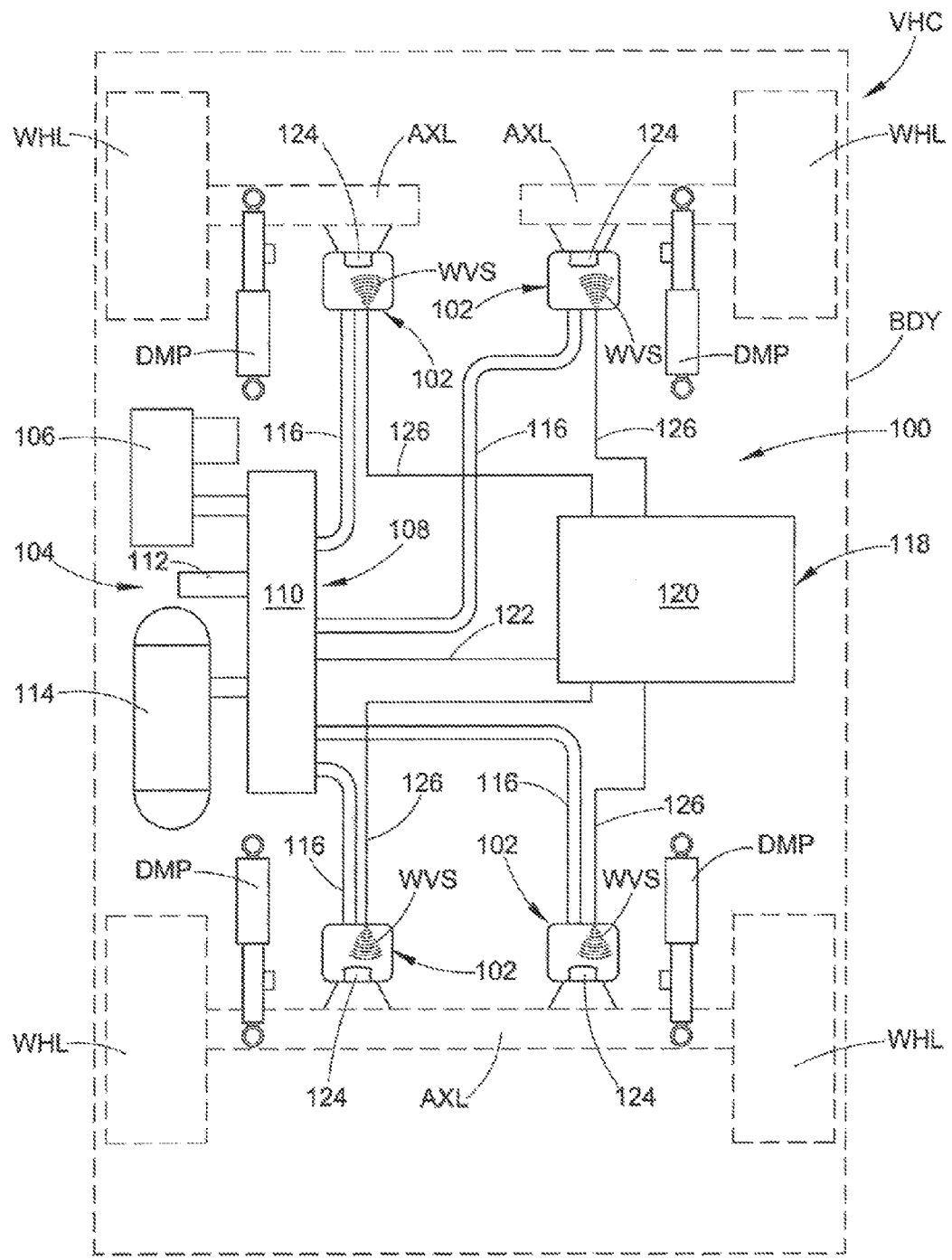
FIG. 1 is a schematic representation of one example of a suspension system of an associated vehicle including gas spring assemblies in accordance with the subject matter of the present disclosure.

FIG. 1 illustrates one example of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner. Additionally, it will also be appreciated that such a suspension system of the vehicle can also optionally include a plurality of damping members, such as dampers DMP, for example, and that any such damping members can also be operatively connected between the sprung and unsprung masses of the associated vehicle in any suitable manner.

As discussed above, the suspension system includes a plurality of gas spring assemblies supported between the sprung and unsprung masses of the associated vehicle. In the arrangement shown in FIG. 1, suspension system 100 includes four gas spring assemblies 102, one of which is disposed toward each corner of the associated vehicle adjacent a corresponding wheel WHL. However, it will be appreciated that any other suitable number of gas spring assemblies could alternately be used in any other configuration or arrangement. As shown in FIG. 1, gas spring assemblies 102 are supported between axles AXL and body BDY of associated vehicle VHC. Additionally, it will be recognized that the gas spring assemblies shown and described herein (e.g., gas spring assemblies 102) are of a rolling-lobe type construction. It is to be understood, however, that gas spring assemblies of any other type, kind and/or construction could alternately be used.

Suspension system 100 also includes a pressurized gas system 104 operatively associated with the gas spring assemblies for selectively supplying pressurized gas (e.g., air) thereto and selectively transferring pressurized gas therefrom. In the exemplary arrangement shown in FIG. 1, pressurized gas system 104 includes a pressurized gas source, such as a compressor 106, for example, for generating pressurized air or other gases. A valve assembly 108 is shown as being in communication with compressor 106 and can be of any suitable configuration or arrangement. In the exemplary embodiment shown, valve assembly 108 includes a valve block 110 with a plurality of valves (not shown) supported thereon. Valve assembly 108 can also optionally include a suitable exhaust, such as a muffler 112, for example, for venting pressurized gas from the system. Additionally, pressurized gas system 104 can also, optionally, include a reservoir 114 in fluid communication with valve assembly 108 and suitable for storing pressurized gas.

Valve assembly 108 is in communication with gas spring assemblies 102 through suitable transmission lines 116. As such, pressurized gas can be selectively transmitted to and/or from the gas springs through valve assembly 108, such as to alter or maintain vehicle height at one or more corners of the vehicle, for example.

Suspension system 100 also includes a control system 118 capable of communication with any one or more other systems and/or components (not shown) of suspension system 100 for selective operation and control thereof. Control system 118 includes a controller or electronic control unit (ECU) 120 in communication with compressor 106 and/or valve assembly 108, such as through a conductor or lead 122, for example, for selective operation and control thereof, including supplying and exhausting pressurized fluid to and from gas spring assemblies 102. Controller 120 can be of any suitable type, kind and/or configuration.

Control system 118 also includes one or more height or distance sensing devices (not shown in FIG. 1) that are capable of transmitting and receiving sensing waves WVS that are shown in FIG. 1 as being directed toward reflectors 124. The one or more height or distance sensing devices are operatively associated with the gas spring assemblies and capable of outputting or otherwise generating data, signals or other communications having a relation to a height of the gas spring assemblies or a distance between other components of the vehicle. These height or distance sensing devices are in communication with ECU 120, which receives the height or distance signals therefrom. The height or distance sensing devices can be in communication with ECU 120 in any suitable manner, such as through conductors or leads 126, for example. It will be appreciated that the height or distance sensing devices can be of any suitable type, kind or construction without departing from the scope and intent of the subject matter of the present disclosure. Additionally, it will be appreciated that such height or distance sensing devices can function using any suitable principles of operation and can send and/or receive sensing waves of any suitable type and/or kind, such as ultrasonic waves and/or electromagnetic waves, for example.

As indicated above, it will be appreciated that gas spring assemblies in accordance with the subject matter of the present disclosure can be of any suitable type, kind and/or configuration. One example of a gas spring assembly 200 that can be representative of gas spring assemblies 102 of suspension system 100 in FIG. 1, for example, includes a first end member 202, a second end member 204 spaced from the first end member, and a flexible spring member 206 that is secured between the first and second end members and at least partially defines a spring chamber 208 formed therebetween. Additionally, it will be appreciated that gas spring assembly 200 can be disposed between the associated sprung and unsprung masses of the associated vehicle in any suitable manner. For example, the first end member can be operatively connected to the associated sprung mass with the second end member disposed toward and operatively connected to the associated unsprung mass. In the embodiment shown in FIGS. 2 and 3, first end member 202 is secured along a first structural member, such as associated vehicle body BDY, for example, and can be secured thereon in any suitable manner, such as by using mounting studs 210, for example. Additionally, second end member 204 is secured along a second structural member, such as an axle or a wheel-engaging member WEM, for example, in any suitable manner, such as by using a mounting stud 212 and a corresponding nut 214, for example.

First end member 202 and second end member 204 can be of any suitable type, kind, construction and/or configuration. In the exemplary embodiment shown in FIGS. 2 and 3, for example, first end member 202 is an end plate that is secured to a first end 216 of flexible spring member 206 using a crimped-edge connection 218. Additionally, second end member 204 is shown in the exemplary embodiment in FIGS. 2 and 3 as being a piston that has an outer side wall 220 that extends generally between a first or upper end wall 222 and a second or lower end wall 224. A second end 226 of flexible spring member 206 is secured on upper end wall 222 of second end member 204 using an end closure 228. The end closure can be secured on the second end member in any suitable manner. In the exemplary embodiment shown, a retaining nut 230 is threadably secured on mounting stud 212 and engages end closure 228. By securing mounting stud 212 on end member 204 using nut 232, the end closure can be drawn tight to upper end wall 222 to thereby secure second end 226 of the flexible spring member therebetween. It is to be understood, however, that the arrangement shown and described is merely exemplary and that any other suitable construction and/or configuration can alternately be used.

Figure 2:
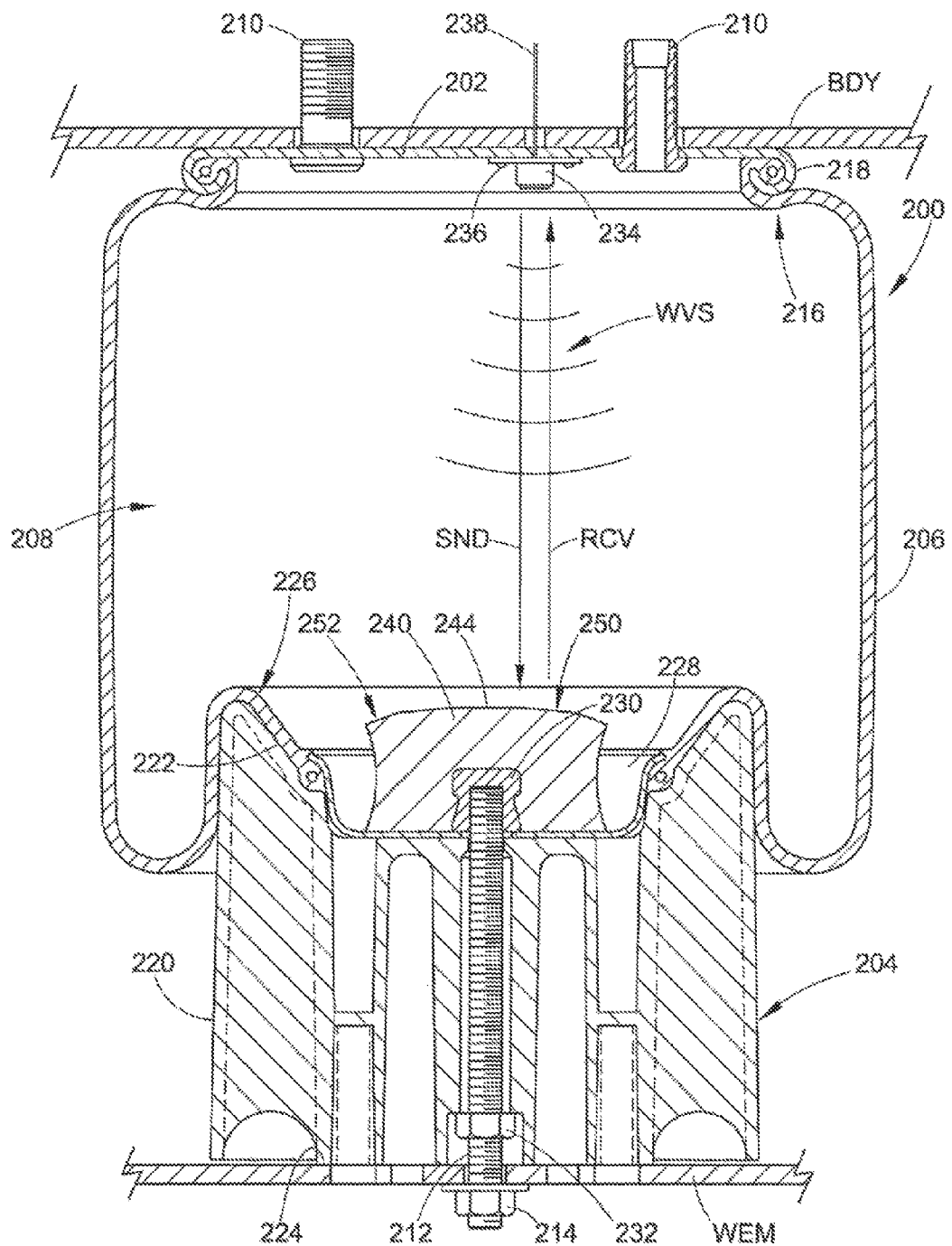
FIG. 2 is a side view, in partial cross-section, of one example of a gas spring assembly in accordance with the subject matter of the present disclosure with an end member and reflector thereof shown in a first orientation.
Figure 3:
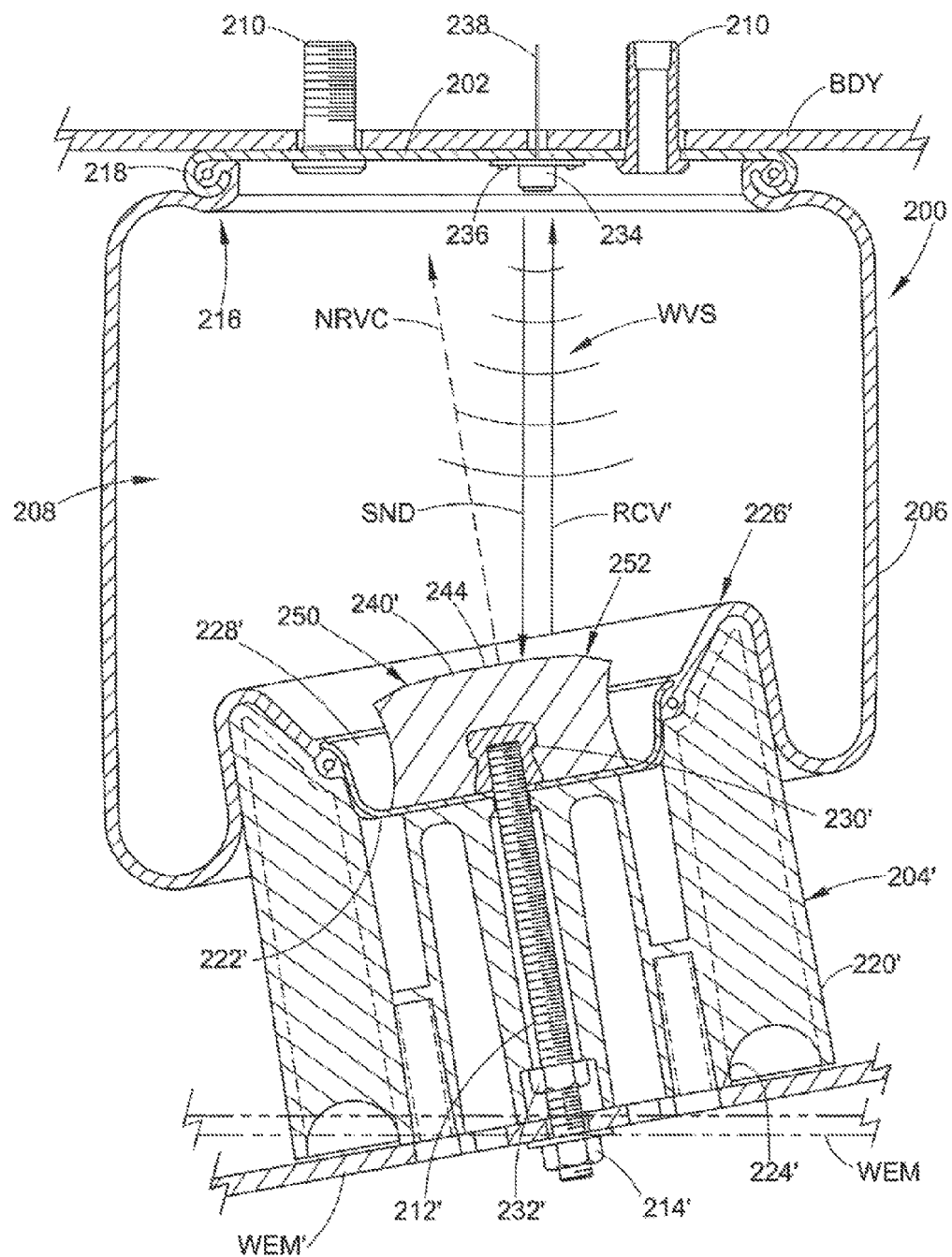
FIG. 3 is a side view, in partial cross-section, of the gas spring assembly in FIG. 2 with the end member and reflector thereof shown in a second orientation.

A height or distance sensing device 234 is shown in FIGS. 2 and 3 as being secured within spring chamber 208 along first end member 202 and being secured thereto using suitable fasteners 236. Sensing device 234 can be connected to other systems and/or components of a vehicle suspension system in any suitable manner. As shown in FIGS. 2 and 3, sensing device 234 includes a lead or connection 238 that can be used for such communication purposes, such as is indicated by leads 126 of control system 118 in FIG. 1, for example.

Sensing device 234 is capable of sending and receiving sensing waves WVS, as indicated by arrows SND and RCV. As such, it will be recognized that sensing device 234 includes a sensing wave sending or transmitting portion and a sensing wave receiving portion located within the same housing. As such, the sending and/or receiving portions can communicate data, information and/or signals corresponding to the sending and/or receiving of such sensing waves through lead 238. In an alternate arrangement, the sensing device could be disposed outside of the spring chamber, such as along the exterior of the first end member, for example. In such an arrangement, an opening or passage can be provided in the first end member adjacent the sensing device and the waves and be transmitted and received by the sensing device through the opening or passage.

As shown in FIGS. 2 and 3, sensing waves WVS are transmitted from sensing device 234 toward a reflector 240, as indicated by arrow SND. Reflector 240 is capable of reflecting the sensing waves back toward the sensing device to be received thereby, as indicated by arrow RCV. Reflector 240 can be formed from any suitable material and can be supported within the spring chamber in any suitable manner. For example, reflector 240 can include a cavity 242 that is received on and engages retaining nut 230 along second end member 204. It will be appreciated, however, that any other suitable mounting arrangement could alternately be used. Additionally, reflector 240 can be formed from any suitable material or combination of materials without departing from the principles of the present novel concept. For example, the reflector can be formed from hard or soft rubber, a thermoplastic elastomer or a more rigid plastic material. In one preferred embodiment, reflector 240 is formed from a material suitable for use as a jounce bumper so that the reflector can operate as both a target for the sensing waves as well as a jounce bumper for the operation of the suspension system.

Figure 4:
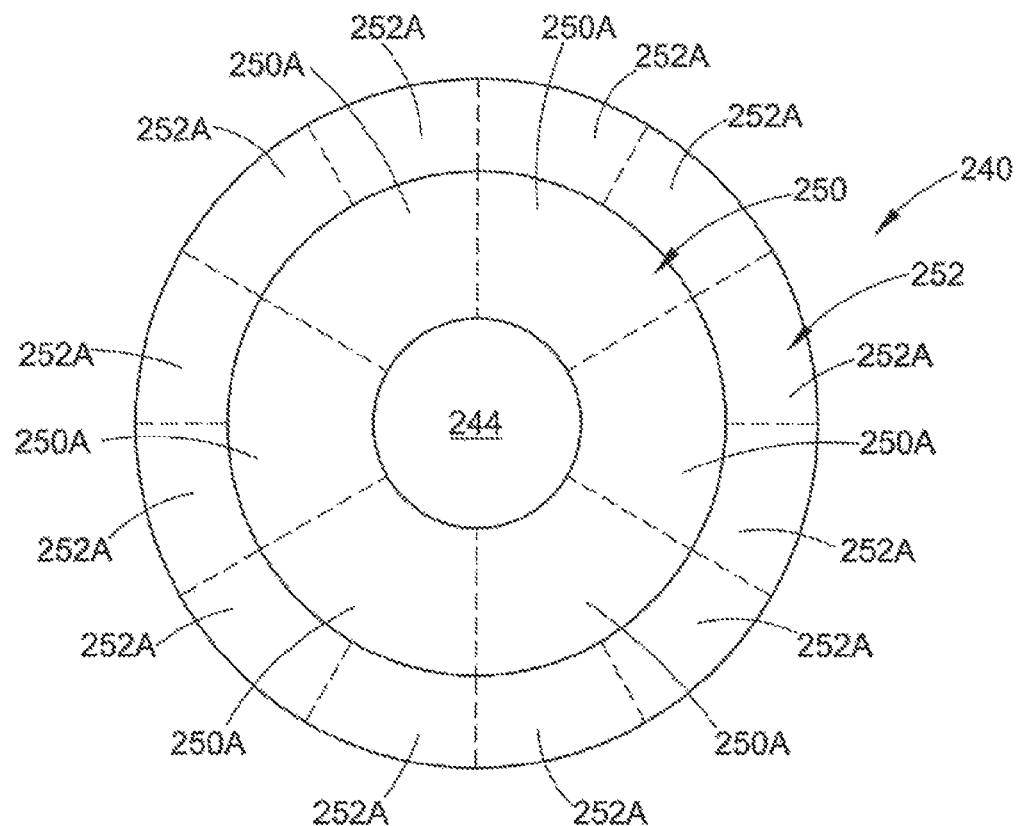
FIG. 4 is a top view of one example of a reflector in accordance with the subject matter of the present disclosure.
Figure 5:
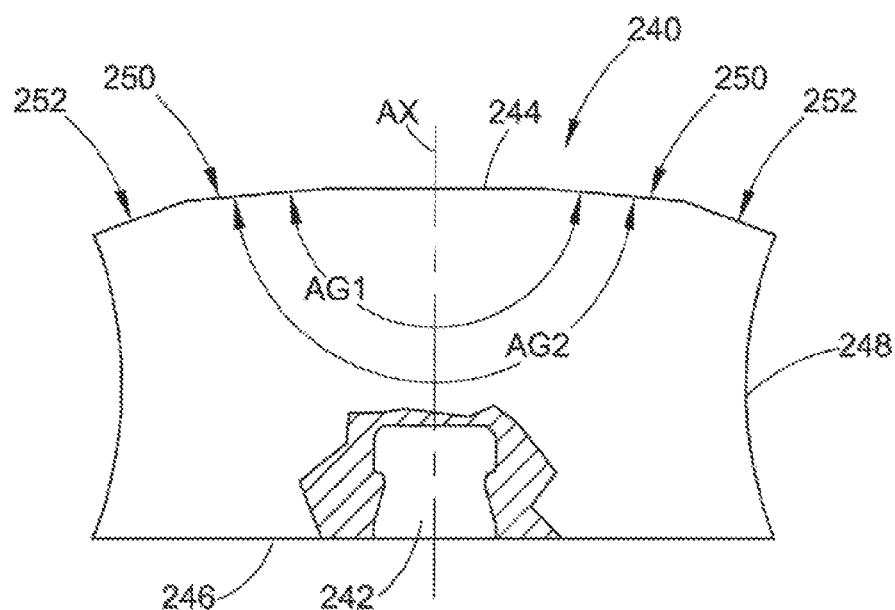
FIG. 5 is a side view, in partial cross-section, of the reflector in FIG. 4.

The exemplary embodiment of reflector 240 is shown in greater detail in FIGS. 4 and 5 and includes a first end surface 244 and a second or opposing end surface 246 spaced from the first end surface. A side surface 248 extends from along second end surface 246 toward first end surface 244. An axis AX is shown in FIG. 5 as extending between first and second end surfaces 244 and 246, and in one exemplary embodiment the side surface extends circumferentially about the axis. In the embodiment shown, side surface 248 includes an approximately concave profile extending inwardly from along the second reflecting surface. However, it will be appreciated that the side surface can take any suitable shape, profile or configuration.

Additionally, reflector 240 can include any number of two or more reflecting surfaces that are angularly disposed relative to a reference surface, such as first end surface 244, for example. In the exemplary embodiment shown, a first reflecting surface 250 extends from adjacent first end surface 244 toward second end surface 246 at a first included angle AG1. A second reflecting surface 252 extends from adjacent first reflecting surface 250 toward second end surface 246 at a second included angle AG2. It will be appreciated that any suitable angles can be used for first and second included angles AG1 and AG2. For example, the first included angle could be from about 100 degrees to about 175 degrees and is preferably greater than the second included angle, which could be from about 95 degrees to about 170 degrees. In the exemplary embodiment shown in FIGS. 2-5, first and second included angles AG1 and AG2 are about 170 and 140 degrees, respectively.

The exemplary embodiment of reflector 240 shown in FIGS. 4 and 5 also illustrates that first end surface 244 and second end surface 246 can be substantially planar. It will be appreciated, however, that the first and second end surfaces can take any suitable form, shape or profile. Additionally, in one exemplary embodiment of reflector 240, first and second reflecting surfaces 250 and 252 can be approximately frustoconical. One advantage of such an arrangement is that the reflector can be secured within the spring chamber without regard to the any specific feature relative to the sensing device or other components or features.

In an alternate embodiment of reflector 240, either or both of first and second reflecting surfaces 250 and 252 can optionally include a plurality of facets or reflecting zones 250A and 252A formed therealong. The plurality of reflecting surfaces are operative to form the corresponding reflecting surface into a plurality of reflecting surfaces. In the exemplary embodiment in FIG. 5, six reflecting zones or surfaces 250A and twelve reflecting zones or surfaces 252A are shown. It will be appreciated, however, that any suitable number of facets could alternately be used.

In one preferred arrangement of this alternate embodiment, a plurality of reflecting zones are formed along each of first and second reflecting surfaces. Additionally, the reflecting zones (e.g., 250A and/or 252A) of each reflecting surface are preferably disposed substantially adjacent one another and are uniformly distributed along the reflecting surface, such as being evenly spaced about axis AX, for example. One advantage of such an arrangement is that the reflector can be secured within the spring chamber without regard to the alignment of the uniformly distributed reflecting zones with the sensing device or other components or features. However, it will be appreciated that any other suitable arrangement or configuration of reflecting zones could alternately be use. For example, the reflecting zones could be of varying size or shape. Furthermore, the reflecting zones can be of any suitable profile or contour. For example, each of the reflecting zones could have one or more inwardly or outwardly extending curves. Alternately, in one preferred embodiment, the reflecting zones could be substantially planar or include a substantially planar portion.

Returning once again to FIGS. 2 and 3, it will be appreciated that second or lower end member 204 is, in FIG. 2, disposed in approximate alignment with first or upper end member 202 and is also in approximately transverse alignment with the direction of transmission of the sensing waves indicated by arrow SND. As such, at least a portion of the transmitted sensing waves reflect off of a target area of the reflector, such as first end surface 244, for example, and travel back toward the sensing device, as indicated by arrow RCV. However, as the second end member moves into a second position that is differently aligned with the first end member and the direction of transmission of the sensing waves, the target area of the reflector also becomes differently aligned.

As illustrated in FIG. 3, this second position in which the various features and components are differently aligned from the position shown in FIG. 2 is generally indicated in FIG. 3 by using primed (') item number and characters. As mentioned above, once the second end member is disposed in a second, non-aligned position, the target area of the reflector is also disposed in a differently aligned position. Accordingly, sensing waves received from the direction indicated by arrow SND could be reflected by the original target area along the direction indicated by arrow NRCV. In which case, the reflected sensing waves may be directed away from the sensing device and, thus, may not be adequately received thereby to provide the desired level of sensor output, performance and/or reliability.

Using reflector 240, however, one or more of reflector surfaces 250 and 252 are positioned as target areas when in the second position in FIG. 3, as indicated by item numbers 240', 250' and 252'. Due to the disposition of the reflector surfaces at angles to the original target area (i.e., first end surface 244') the reflector surfaces can at least partially compensate for the different alignment and, thus, may reflect the transmitted sensing waves back toward the sensing device, as indicated by arrow RCV'. Additionally, the plurality of facets or reflecting zones 250A and/or 252A (not shown in FIG. 3) can optionally be included along one or more of the reflecting surfaces and may further assist in reflecting sensing waves toward the wave sensing device.

Another example a gas spring assembly 400 in accordance with the subject matter of the present disclosure is shown in FIGS. 6-10 as having a longitudinally-extending axis AX (FIG. 7) and can include one or more end members, such as an end member 402 and an end member 404 that is spaced longitudinally from end member 402. A flexible spring member 406 can extend peripherally around axis AX and can be secured between the end members in a substantially fluid-tight manner such that a spring chamber 408 (FIG. 7) is at least partially defined therebetween.

Gas spring assembly 400 can be disposed between associated sprung and unsprung masses of an associated vehicle in any suitable manner. For example, one end member can be operatively connected to the associated sprung mass with the other end member disposed toward and operatively connected to the associated unsprung mass. In the arrangement shown in FIGS. 6 and 7, for example, end member 402 is secured along a first or upper structural component USC, such as associated vehicle body BDY in FIG. 1, for example, and can be secured thereon in any suitable manner. For example, one or more securement devices, such as mounting studs 410, for example, can be included along end member 402. In some cases, the one or more securement devices (e.g., mounting studs 410) can project outwardly from end member 402 and can be secured thereon in a suitable manner, such as, for example, by way of a flowed-material joint (not shown) or a press-fit connection (not identified). Additionally, such one or more securement devices can extend through mounting holes HLS in upper structural component USC and receive one or more threaded nuts 412 or other securement devices, for example. As an alternative to one or more of mounting studs 410, one or more threaded passages (e.g., blind passages and/or through passages) could be used in conjunction with a corresponding number of one or more threaded fasteners.

Additionally, a fluid communication port, such as a transfer passage 414 (FIG. 7), for example, can optionally be provided to permit fluid communication with spring chamber 408, such as may be used for transferring pressurized gas into and/or out of the spring chamber, for example. In the exemplary embodiment shown, transfer passage 414 extends through at least one of mounting studs 410 and is in fluid communication with spring chamber 408. It will be appreciated, however, that any other suitable fluid communication arrangement could alternately be used.

End member 404 can be secured along a second or lower structural component LSC, such as an axle AXL in FIG. 1, for example, in any suitable manner. As one example, lower structural component LSC could include one or more mounting holes HLS extending therethrough. In such case, a threaded fastener 416 could extend through one of mounting holes HLS and threadably engage end member 404 to secure the end member on or along the lower structural component.

It will be appreciated that the one or more end members can be of any suitable type, kind, construction and/or configuration, and can be operatively connected or otherwise secured to the flexible spring member in any suitable manner. In the exemplary arrangement shown in FIGS. 6 and 7, for example, end member 402 is of a type commonly referred to as a bead plate and is secured to a first end 418 of flexible spring member 406 using a crimped-edge connection 420. End member 404 is shown in the exemplary arrangement in FIGS. 6-10 as being of a type commonly referred to as a piston (or a roll-off piston) that has an outer surface 422 that abuttingly engages flexible spring member 406 such that a rolling lobe 424 is formed therealong. As gas spring assembly 400 is displaced between extended and collapsed conditions, rolling lobe 424 is displaced along outer surface 422 in a conventional manner.

End member 404 includes an end member body 426 and extends from along a first or upper end 428 toward a second or lower end 430 that is spaced longitudinally from end 428. Body 426 includes a longitudinally-extending outer side wall 432 that extends peripherally about axis AX and at least partially defines outer surface 422. An end wall 434 is disposed transverse to axis AX and extends radially-inwardly from along a shoulder portion 436, which is disposed along the outer side wall toward end 428. Body 426 also includes an inner side wall 438 that extends longitudinally-outwardly beyond end wall 434 and peripherally about axis AX. Inner side wall 438 has an outer surface 440 that is dimensioned to receive a second end 442 of flexible spring member 406 such that a substantially fluid-tight seal can be formed therebetween. A retaining ridge 444 can project radially-outwardly from along inner side wall 438 and can extend peripherally along at least a portion thereof, such as may assist in retaining second end 442 of flexible spring member 406 on or along end member 404, for example.

End member body 426 also includes a bottom wall 446 that is approximately planar and disposed transverse to axis AX such that outer side wall 432 and bottom wall 446 at least partially define a cavity or chamber 448 within body 426. Additionally, end member 404 can, optionally, include one or more features or components suitable for use in securing the end member on or along an associated structural component. As one example, a threaded passage 450 can extend into a projection or boss 452 formed along bottom wall 446 and extending into chamber 448. Threaded passage 450 can include one or more helical threads (not numbered) and can be dimensioned to receive a suitable threaded fastener (e.g., threaded fastener 416) for securement of the end member on or along the associate structural component (e.g., lower structural component LSC).

An end member in accordance with the subject matter of the present disclosure can differ from conventional gas spring piston constructions in that an end member in accordance with the subject matter of the present disclosure can include a reflector capable of reflecting sensing waves from a sensing device transmitter back toward a sensing device receiver under a plurality of orientations of the end member. It will be appreciated that such a reflector can be of any suitable size, shape, form, configuration and/or arrangement, and can be provided on or along the end member in any suitable manner. As one example, the reflector could be provided separate and apart from the end member body and secured to the end member body to at least partially form an end member assembly. As another example, the reflector could be integrally formed as a part of the end member body, such as by being formed by one or more walls or wall portions of the end member body, for example. In some cases, end member can be molded or otherwise formed from a substantially-rigid thermoplastic material and the reflector can be molded or otherwise formed into the end member body as one or more wall portions thereof. It will be appreciated, however, that other configurations and/or arrangements could alternately be used.

In the arrangement shown in FIGS. 7-10, for example, end member 404 includes a reflector 454 that can be formed in any suitable manner and from any combination of walls and/or wall portions. For example, reflector 454 can be at least partially formed by a reflector wall (or reflector wall portion) 456 that extends across end 428 of the end member body. In the arrangement shown in FIGS. 7-10, reflector wall 456 can extend across and operatively interconnect with inner side wall 438, such as from along a distal edge 458 thereof, for example. In some cases, distal edge 458 can at least partially form a distal edge surface (not numbered) that can, in some cases, function as a reflective surface under certain conditions of use.

Additionally, or in the alternative, reflector wall 456 can include an end wall portion 460 that is disposed generally transverse to axis AX and spaced axially from distal edge 458 such that reflector 454 has a generally concave overall shape. In some cases, distal edge 458 can have an approximately planar surface portion that can function as a reflecting surface (not numbered). Also, in some case, end wall portion 460 can include a substantially planar wall portion or otherwise have a substantially linear cross-sectional profile that can function as a reflecting surface 462. Furthermore, end wall portion 460 can, optionally, include one or more holes or passages 464 extending therethrough and dimensioned to permit fluid communication between spring chamber 408 and chamber 448 of end member 404.

An end member in accordance with the subject matter of the present disclosure can include a reflector that can include one or more reflecting zones or areas that extend peripherally about axis AX. In some cases, a plurality of reflecting zones or areas can be included that extend in a radial or otherwise generally concentric relation to one another. In such cases, at least a portion or one or more of the plurality of reflecting zones can extend radially inward beyond an innermost peripheral extent of the outer side wall of the end member.

Additionally, where a plurality of reflecting zones or areas are included, the different reflecting zones can have cross-sectional profiles that extend at different angles relative to one another as well as relative to axis AX and/or a reference surface (e.g., reflecting surface 462). In some cases, an identifiable intersection between adjacent reflecting zones or portions thereof may be included on or along reflector 454. In the arrangement shown in FIGS. 7-10, for example, reflector 454 can include a reflecting zone 466 that can be at least partially formed by a reflector wall portion 468 and can include at least one reflecting surface 470. Reflector 454 is also shown as including a reflecting zone 472 that is disposed radially outward from reflecting zone 466. Reflecting zone 472 can be at least partially formed by a reflector wall portion 474 and can include at least one reflecting surface 476.

The one or more reflecting zones (e.g., reflecting zones 466 and 472) can include at least one reflecting surface (e.g., reflecting surfaces 470 and 476) that is capable of reflecting sensing waves from a sensing device transmitter back toward a sensing device receiver under an orientation of the end member with different reflecting surfaces being capable of reflecting the sensing waves at different orientations of the end member. In some cases, reflecting surfaces 470 and/or 476 can take the form of single, substantially continuous surfaces, such as frustoconical surfaces, for example. In other cases, reflecting surfaces 470 and/or 476 can, optionally, include a plurality of facets or discrete reflecting surface portions formed therealong, such as are represented by surface portions 470A and 476A and separated by dashed lines in FIG. 8. In such cases, at least one of reflecting surfaces 470 and/or 476 can include a plurality of discrete reflecting surface portions, such as four or more reflecting surface portions, for example. In the exemplary arrangement in FIGS. 7-9, reflecting surfaces 470 and 476 can each include twelve reflecting surface portions 470A and 476A are shown. It will be appreciated, however, that any suitable number of facets or reflecting surface portions could alternately be used. One advantage of a construction that includes a plurality of faceted or otherwise discrete surface portions that are arrayed around axis AX is that the end member can be secured to the flexible spring member without regard to the particular position or orientation of the sensing device or opposing end member of the gas spring assembly.

As discussed above, reflector 454 can include any number of two or more reflecting zones that are angularly disposed relative to a reference surface, such as end wall portion 460, for example. In the exemplary arrangement shown, reflecting surface 470 of reflecting zone 466 can extend in a radially outward direction from adjacent reflecting surface 462 of end wall portion 460 toward inner side wall 438 at a first included angle AG1. Additionally, reflecting surface 476 of reflecting zone 472 can extend in a radially outward direction from adjacent reflecting surface 470 of reflecting zone 466 toward inner side wall 438 at a second included angle AG2 relative to reflecting surface 462 of end wall portion 460. It will be appreciated that any suitable angles or ranges of angles can be used for first and second included angles AG1 and AG2. For example, the first included angle could be within a range of from approximately 100 degrees to approximately 175 degrees and is preferably greater than the second included angle, which could be within a range of from approximately 95 degrees to approximately 170 degrees. In the exemplary embodiment shown in FIGS. 7-10, first and second included angles AG1 and AG2 are approximately 165 and 150 degrees, respectively.

Furthermore, the angular orientation and/or other geometric relationship between adjacent reflecting surfaces, such as reflecting surfaces 462, 470 and/or 476, for example, can be at least partially defined by an included angle between two adjacent reflecting surfaces. For example, reflecting surface 476 of reflecting zone 472 can extend from along reflecting surface 470 of reflecting zone 466 at a third included angle AG3. It will be appreciated that any suitable angle or range of angles can be used for third included angle AG3. For example, the third included angle could be within a range of from approximately 5 degrees to approximately 85 degrees.

In one preferred arrangement of this alternate embodiment, a plurality of reflecting zones are formed along each of first and second reflecting surfaces. Additionally, the reflecting zones (e.g., 470A and/or 476A) of each reflecting surface are preferably disposed substantially adjacent one another and are uniformly distributed along the reflecting surface, such as being evenly spaced about axis AX, for example. One advantage of such an arrangement is that the reflector can be secured within the spring chamber without regard to the alignment of the uniformly distributed reflecting zones with the sensing device or other components or features. However, it will be appreciated that any other suitable arrangement or configuration of reflecting zones could alternately be use. For example, the reflecting zones could be of varying size or shape. Furthermore, the reflecting zones can be of any suitable profile or contour. For example, each of the reflecting zones could have one or more inwardly or outwardly extending curves. Alternately, in one preferred embodiment, the reflecting zones could be substantially planar or include a substantially planar portion.

Figure 7:
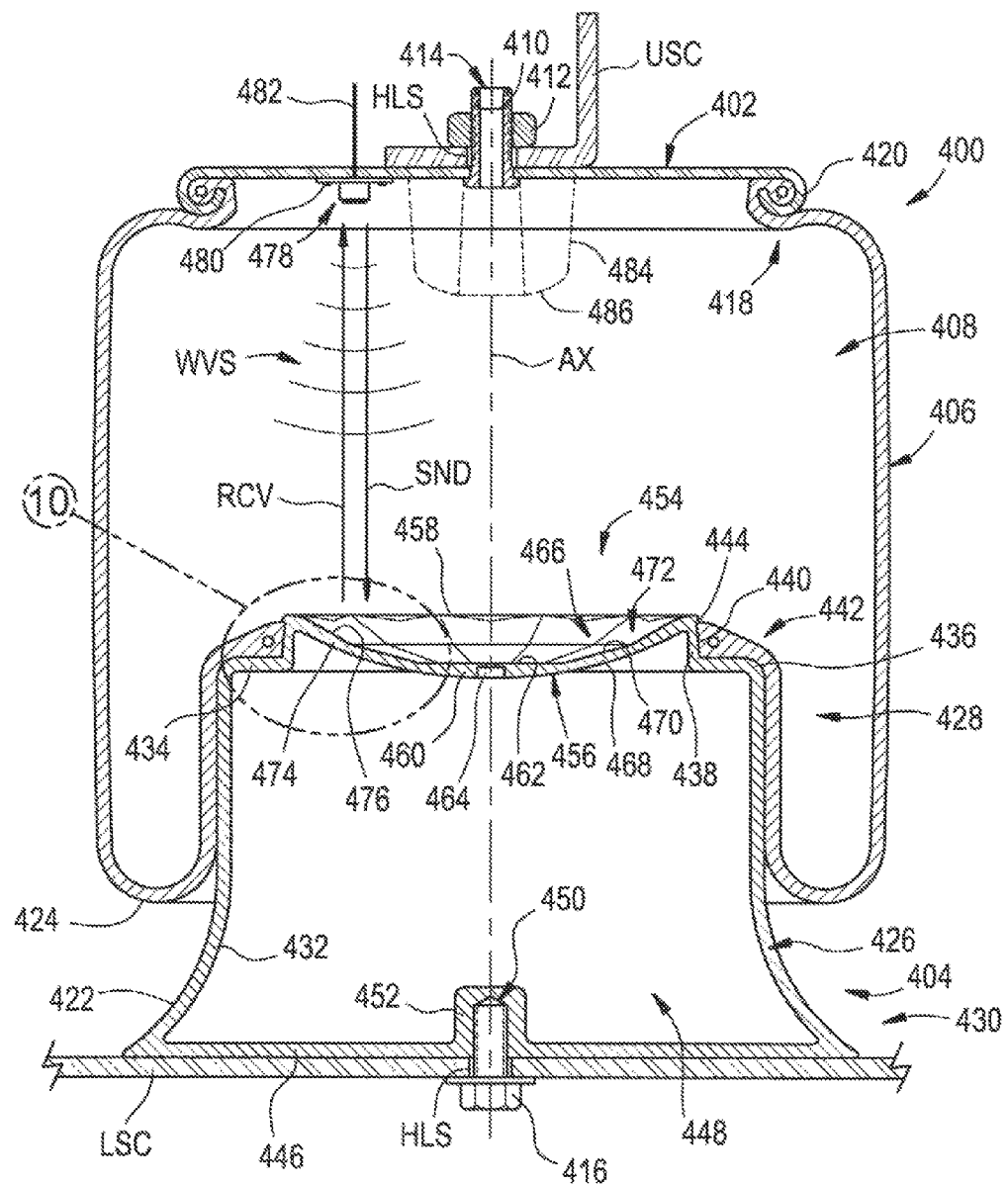
FIG. 7 is a cross-sectional side view of the gas spring assembly in FIG. 6 taken from along line 7-7 therein.
Figure 8:
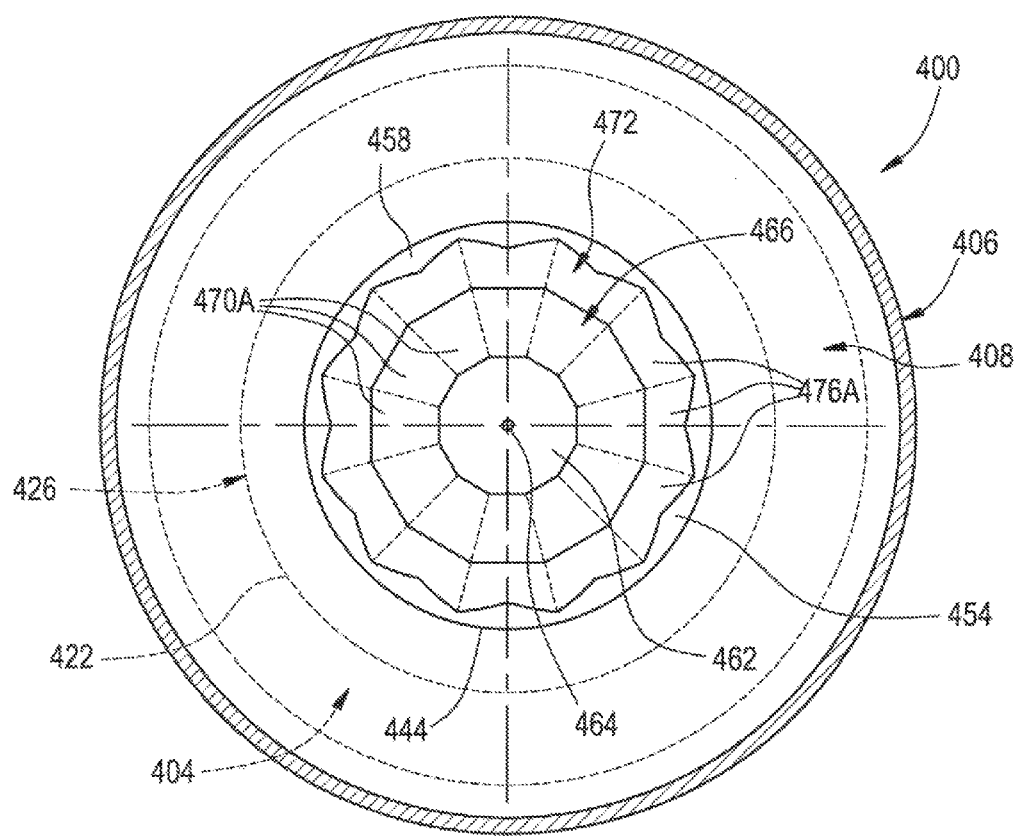
FIG. 8 is cross-sectional top plan view of the gas spring assembly in FIGS. 6 and 7 taken from along line 8-8 in FIG. 6.
Figure 9:
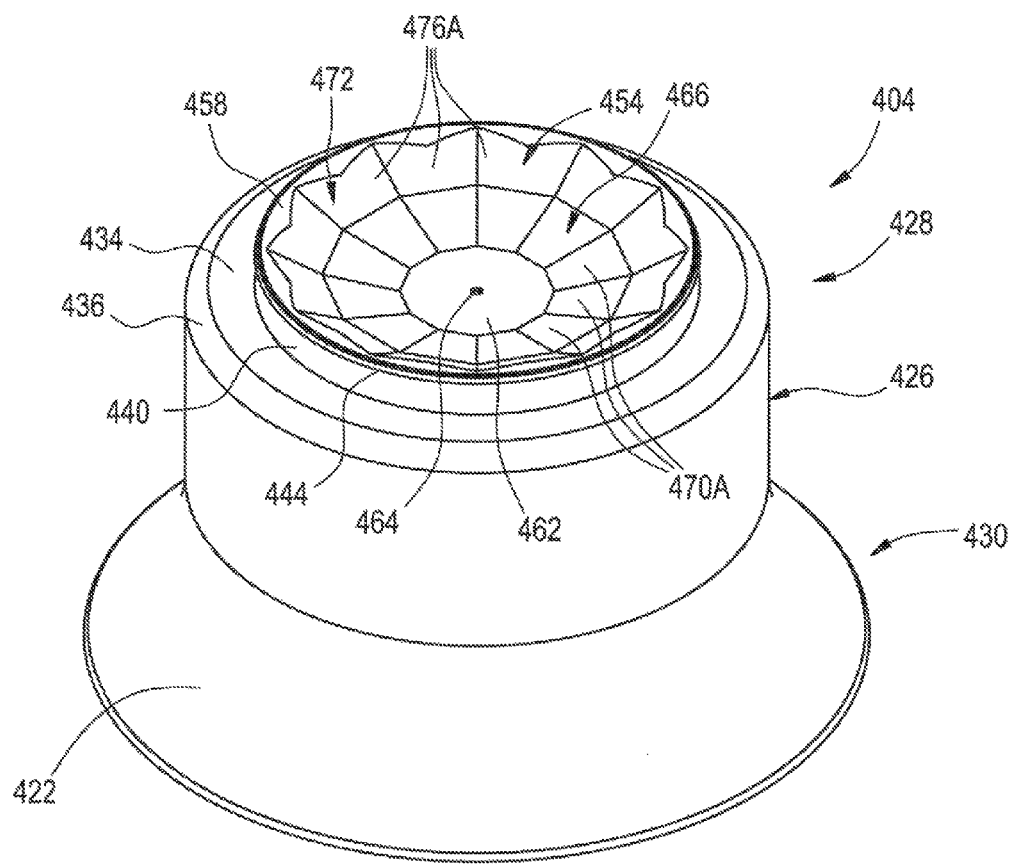
FIG. 9 is a top perspective view of one example of an end member in accordance with the subject matter of the present disclosure as shown in FIGS. 6-8.

A height or distance sensing device 478 is shown in FIG. 7 as being secured within spring chamber 408 along end member 402 and being secured thereto using suitable fasteners 480. Sensing device 478 can be connected to other systems and/or components of a suspension system (e.g., suspension system 100) in any suitable manner. For example, sensing device 478 can include a lead or connection 482 that can be used for such communication purposes, such as is indicated by leads 126 of control system 118 in FIG. 1, for example.

Sensing device 478 is capable of sending and receiving sensing waves WVS, as indicated by arrows SND and RCV. As such, it will be recognized that sensing device 478 includes a wave sending or transmitting portion and a wave receiving portion located within a common housing. As such, the sending and/or receiving portions can communicate data, information and/or signals corresponding to the sending and/or receiving of such sensing waves through lead 482. In an alternate arrangement, the sensing device could be disposed outside of the spring chamber, such as along the exterior of the end member, for example. In such an arrangement, an opening or passage can be provided in the end member adjacent the sensing device and the sensing waves and be transmitted and received by the sensing device through the opening or passage.

Figure 6:
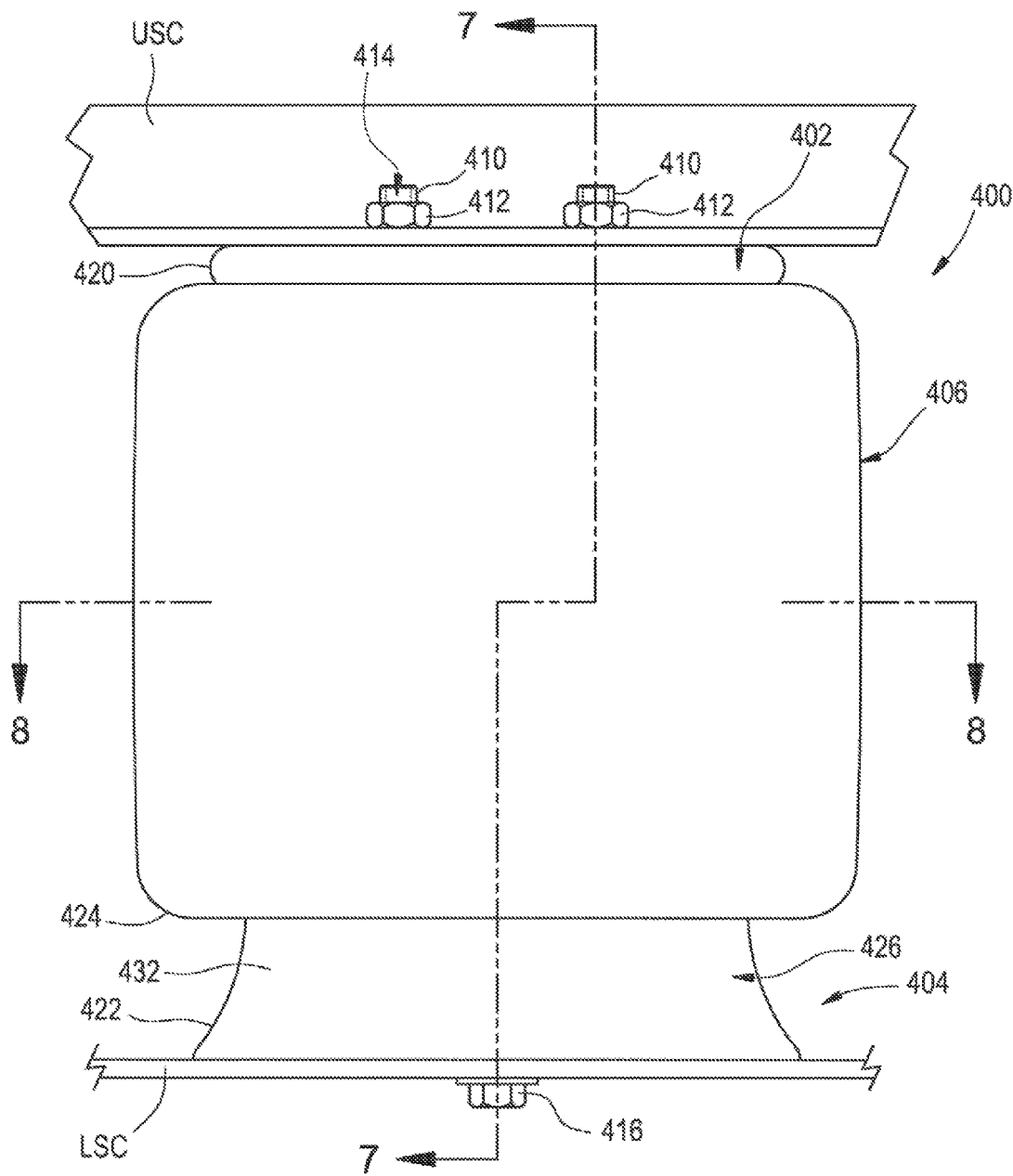
FIG. 6 is a side view of another example of a gas spring assembly in accordance with the subject matter of the present disclosure.
Figure 10:
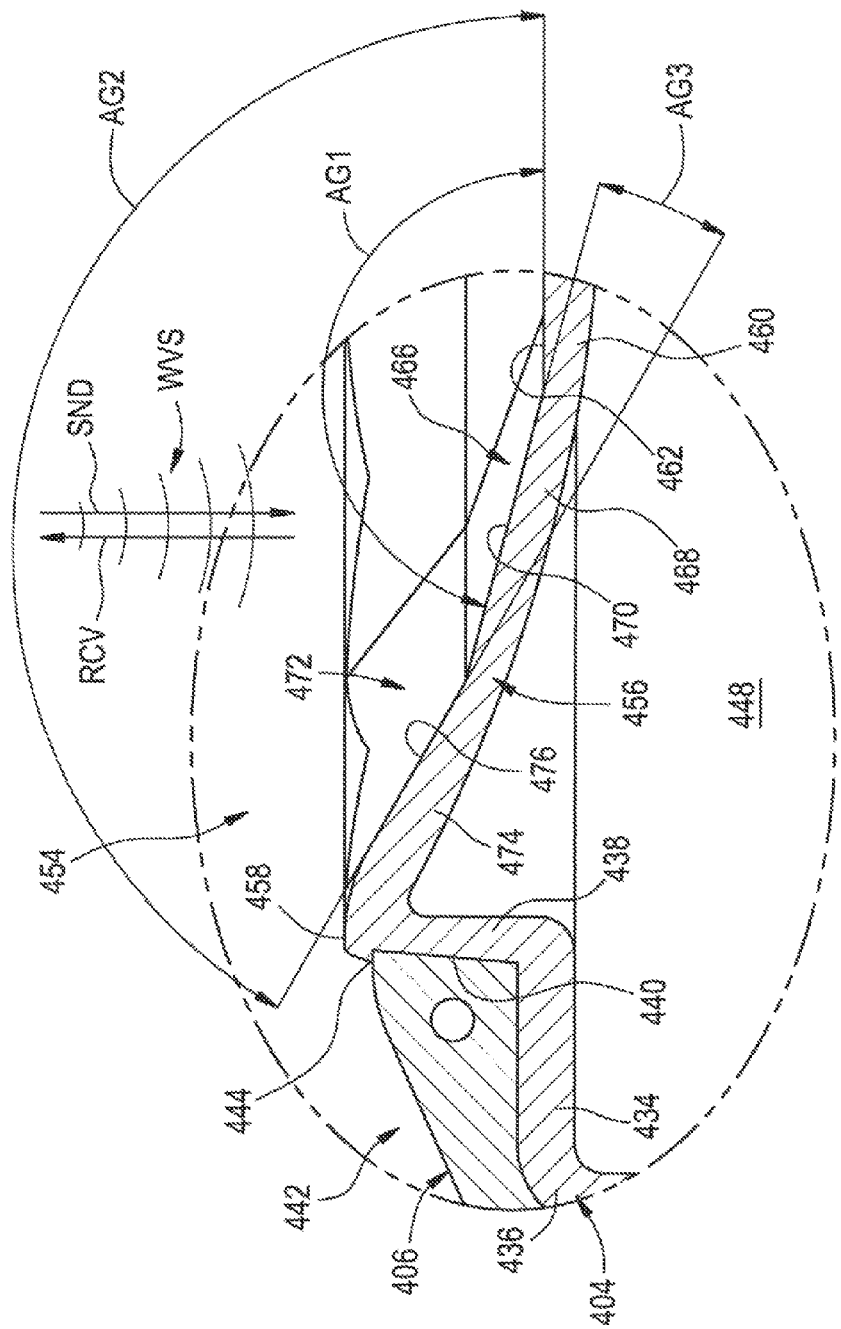
FIG. 10 is an enlarged, cross-sectional view of the portion of the gas spring assembly identified as Detail 10 in FIG. 7.

As shown in FIGS. 7 and 10, sensing waves WVS can be transmitted from sensing device 478 toward a reflector 454, as indicated by arrow SND. Reflector 454 is capable of reflecting the sensing waves back toward the sensing device to be received thereby, as indicated by arrow RCV. It will be appreciated that end member 404 is shown in FIGS. 6 and 7 as being disposed in approximate alignment with end member 402 and also in approximately transverse alignment with the direction of transmission of the sensing waves indicated by arrow SND. As such, at least a portion of the transmitted sensing waves reflect off of a target area of the reflector, such as a surface portion of distal edge 458 and/or reflecting surface 462 of end wall portion 460, for example, and travel back toward the sensing device, as indicated by arrow RCV. However, as the second end member moves into a second position that is differently aligned with the first end member and the direction of transmission of the sensing waves, the target area of the reflector also becomes differently aligned, such as has been shown and described in detail in connection with FIG. 3, for example.

Additionally, it will be appreciated that gas spring assembly 400 can include any suitable number of one or more additional features, components and/or elements. For example, gas spring assembly 400 can, optionally, include a jounce bumper 484 disposed within spring chamber 408. It will be appreciated that such a jounce bumper, if included, can be secured on or along a component of the gas spring assembly in any suitable manner. As one example, jounce bumper 484 is shown in FIG. 7 as being disposed along end member 402 and including a distal end 486 dimensioned to abuttingly engage a corresponding surface or wall portion of end member 404, such as end wall portion 460, for example.

A further example a gas spring assembly 600 in accordance with the subject matter of the present disclosure is shown in FIGS. 11-15 as having a longitudinally-extending axis AX (FIG. 12) and can include one or more end members, such as an end member 602 and an end member 604 that is spaced longitudinally from end member 602. A flexible spring member 606 can extend peripherally around axis AX and can be secured between the end members in a substantially fluid-tight manner such that a spring chamber 608 (FIG. 12) is at least partially defined therebetween.

Gas spring assembly 600 can be disposed between associated sprung and unsprung masses of an associated vehicle in any suitable manner. For example, one end member can be operatively connected to the associated sprung mass with the other end member disposed toward and operatively connected to the associated unsprung mass. In the arrangement shown in FIGS. 11 and 12, for example, end member 602 is secured along a first or upper structural component USC, such as associated vehicle body BDY in FIG. 1, for example, and can be secured thereon in any suitable manner. For example, one or more projections 610 can extend from along end member 602. In some cases, the one or more projections can extend outwardly from end member 602 and through mounting holes HLS in upper structural component USC and receive one or more threaded nuts 612 or other securement devices, for example. As an alternative to one or more of projections 610, one or more threaded passages (e.g., blind passages and/or through passages) could be used in conjunction with a corresponding number of one or more threaded fasteners.

Additionally, a fluid communication port, such as a transfer passage 614 (FIGS. 11 and 12), for example, can optionally be provided to permit fluid communication with spring chamber 608, such as may be used for transferring pressurized gas into and/or out of the spring chamber, for example. In the exemplary embodiment shown, transfer passage 614 extends through projection 610 and is in fluid communication with spring chamber 608. It will be appreciated, however, that any other suitable fluid communication arrangement could alternately be used.

End member 604 can be secured along a second or lower structural component LSC, such as an axle AXL in FIG. 1, for example, in any suitable manner. As one example, lower structural component LSC could include one or more mounting holes HLS extending therethrough. In such case, a threaded fastener 616 could extend through one of mounting holes HLS and threadably engage end member 604 to secure the end member on or along the lower structural component.

It will be appreciated that the one or more end members can be of any suitable type, kind, construction and/or configuration, and can be operatively connected or otherwise secured to the flexible spring member in any suitable manner. In the exemplary arrangement shown in FIGS. 11 and 12, for example, end member 602 is of a type commonly referred to as a top cap or top plate and is secured to a first end 618 of flexible spring member 606 using a retaining ring 620 that can be crimped or otherwise radially-inwardly deformed to capture at least a portion of flexible spring member 606 between the end member and the retaining ring.

Figure 11:
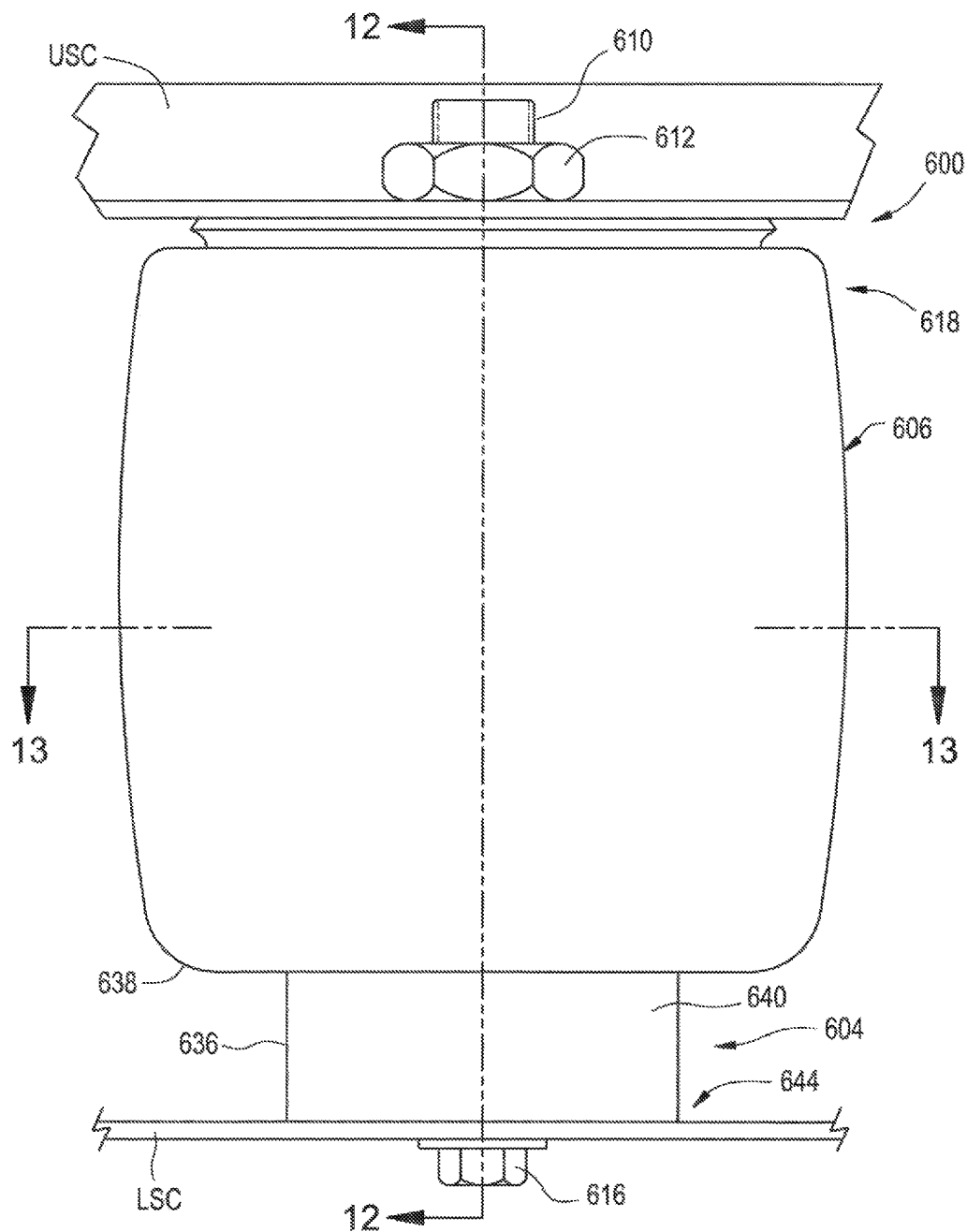
FIG. 11 is a side view of a further example of a gas spring assembly in accordance with the subject matter of the present disclosure.
Figure 12:
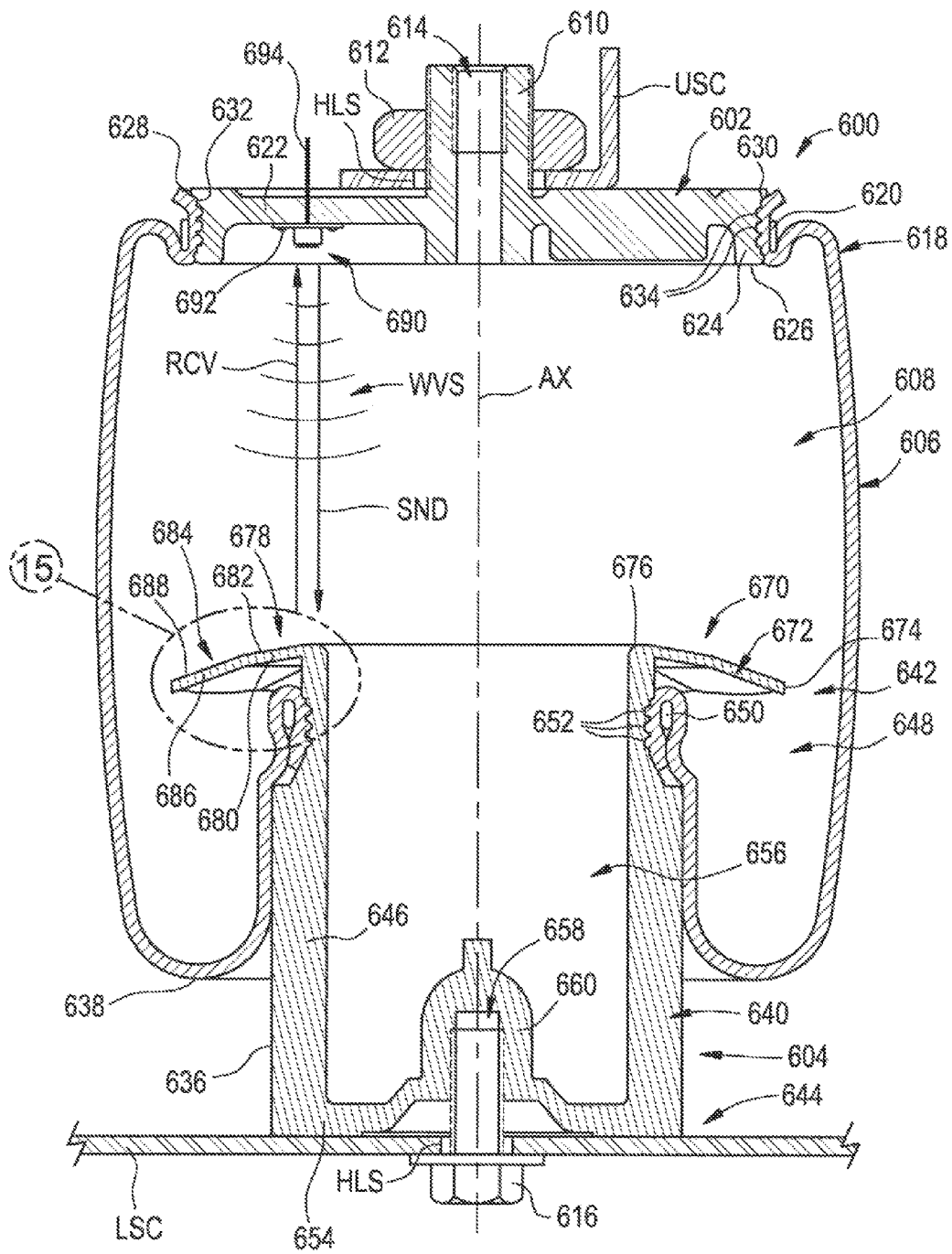
FIG. 12 is a cross-sectional side view of the gas spring assembly in FIG. 11 taken from along line 11-11 therein.
Figure 13:
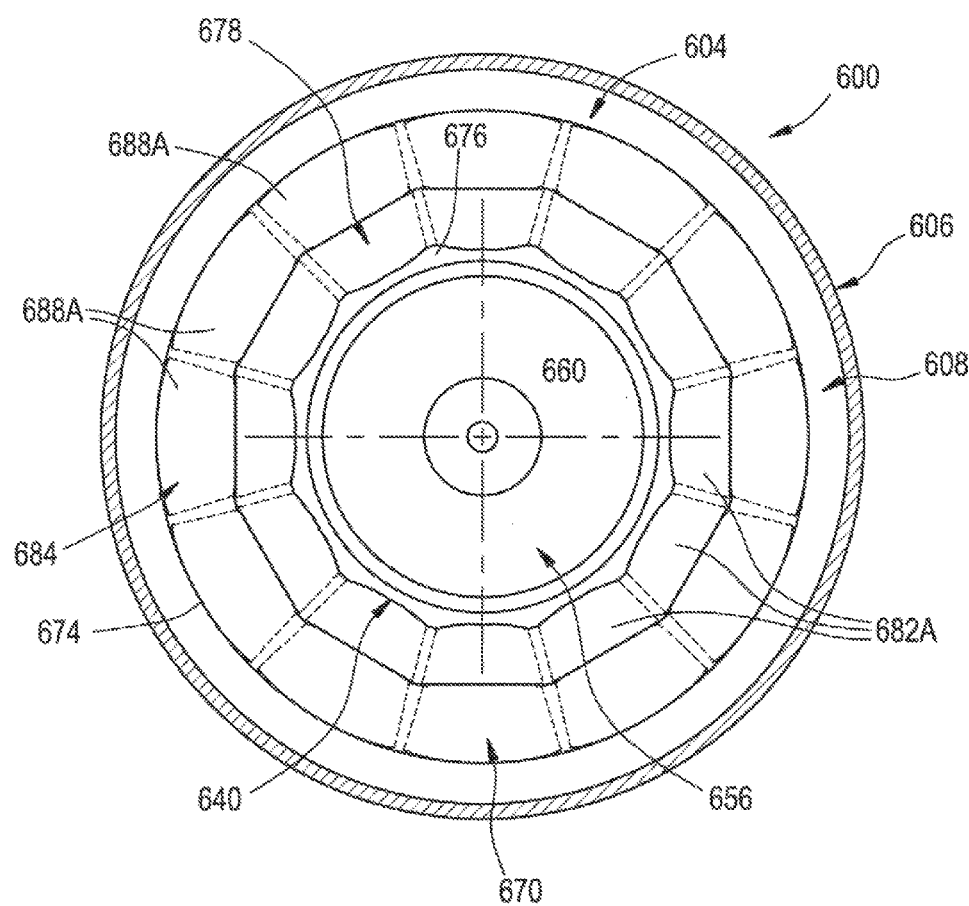
FIG. 13 is cross-sectional top plan view of the gas spring assembly in FIGS. 11 and 12 taken from along line 13-13 in FIG. 11.
Figure 14:
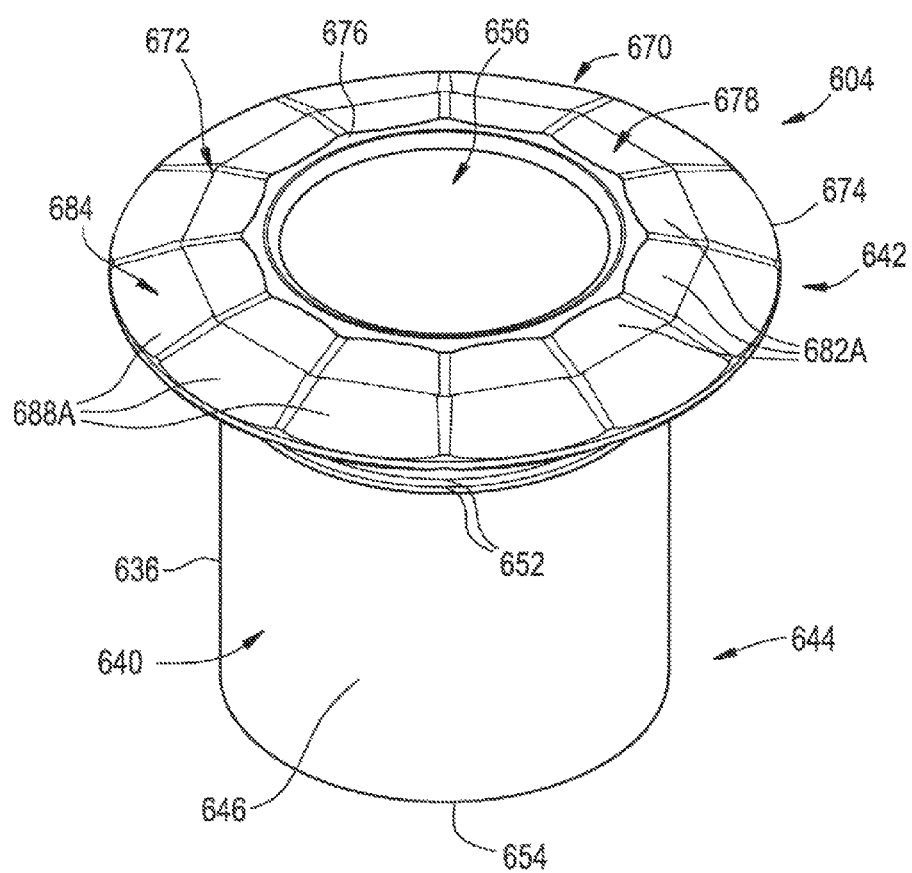
FIG. 14 is a top perspective view of one example of an end member in accordance with the subject matter of the present disclosure as shown in FIGS. 11-13.

In the arrangement shown in FIGS. 11 and 12, end member 602 can include an end wall 622 and an outer side wall 624 that extends from along end wall 622 toward a distal edge 626. End wall 622 includes an outer peripheral edge 628 and outer side wall 624 can be spaced inwardly from outer peripheral edge 628 such that a shoulder surface 630 is at least partially defined between end wall 622 and outer side wall 624 and can extend peripherally about end member 602. Outer side wall 624 can, optionally, include one or more features disposed along an outer surface 632 thereof that may be suitable for engaging a surface of flexible spring member 606 to thereby enhance retention of the flexible spring member and end member in an assembled condition. As one example, the one or more features disposed on or along the outer surface of outer side wall 624 can include a plurality of axially-spaced, endless, annular grooves 634 that extend inwardly into the outer side wall. It will be appreciated, however, that other configurations and/or arrangements could alternately be used.

End member 604 is shown in the exemplary arrangement in FIGS. 11-15 as being of a type commonly referred to as a piston (or a roll-off piston) that has an outer surface 636 that abuttingly engages flexible spring member 606 such that a rolling lobe 638 is formed therealong. As gas spring assembly 600 is displaced between extended and collapsed conditions, rolling lobe 638 is displaced along outer surface 636 in a conventional manner.

End member 604 includes an end member body 640 and extends from along a first or upper end 642 toward a second or lower end 644 that is spaced longitudinally from end 642. Body 640 includes a longitudinally-extending outer side wall 646 that extends peripherally about axis AX and at least partially defines outer surface 636. A second end 648 of flexible spring member 606 can be secured along outer side wall 646 of end member body 640 in any suitable manner, such as by way of a retaining ring 650 that can be crimped or otherwise radially-inwardly deformed to capture at least a portion of flexible spring member 606 between the end member and the retaining ring. In such case, end member body 640 can, optionally, include one or more features disposed along outer surface 636 that may be suitable for engaging a surface of flexible spring member 606 to thereby enhance retention of the flexible spring member and end member in an assembled condition. As one example, the one or more features disposed on or along the outer surface of outer side wall 646 can include a plurality of axially-spaced, endless, annular grooves 652 that extend inwardly into the outer side wall. It will be appreciated, however, that other configurations and/or arrangements could alternately be used.

End member body 640 also includes a bottom wall 654 that is approximately planar and disposed transverse to axis AX such that outer side wall 646 and bottom wall 654 at least partially define a cavity or chamber 656 within body 640. Additionally, end member 604 can, optionally, include one or more features or components suitable for use in securing the end member on or along an associated structural component. As one example, a threaded passage 658 can extend into a projection or boss 660 formed along bottom wall 654 and extending into chamber 656. Threaded passage 658 can include one or more helical threads (not numbered) and can be dimensioned to receive a suitable threaded fastener (e.g., threaded fastener 616) for securement of the end member on or along the associate structural component (e.g., lower structural component LSC).

As discussed above, an end member in accordance with the subject matter of the present disclosure can differ from conventional gas spring piston constructions in that an end member in accordance with the subject matter of the present disclosure can include a reflector capable of reflecting sensing waves from a sensing device transmitter back toward a sensing device receiver under a plurality of orientations of the end member. It will be appreciated that such a reflector can be of any suitable size, shape, form, configuration and/or arrangement, and can be provided on or along the end member in any suitable manner. As one example, the reflector could be provided separate and apart from the end member body and secured to the end member body to at least partially form an end member assembly. As another example, the reflector could be integrally formed as a part of the end member body, such as by being formed by one or more walls or wall portions of the end member body, for example. In some cases, end member can be molded or otherwise formed from a substantially-rigid thermoplastic material and the reflector can be molded or otherwise formed into the end member body as one or more wall portions thereof. It will be appreciated, however, that other configurations and/or arrangements could alternately be used.

In the arrangement shown in FIGS. 11-15, for example, end member 604 includes a reflector 670 that can be formed in any suitable manner and from any combination of walls and/or wall portions. For example, reflector 670 can be at least partially formed by a reflector wall (or reflector wall portion) 672 that extends across or otherwise along end 642 of the end member body. In the arrangement shown in FIGS. 11-15, reflector wall 672 can extend generally transverse to axis AX from along outer side wall 646 in a radially outward direction toward an outermost peripheral edge 674. In some cases, reflector wall 672 can include a distal edge 676 disposed radially inward of outermost peripheral edge 674. Additionally, in some cases, outermost peripheral edge 674 can be spaced axially from distal edge 676 such that reflector 670 has a generally convex overall shape. In some cases, distal edge 676 can have an approximately planar surface portion that can function as a reflecting surface (not numbered).

An end member in accordance with the subject matter of the present disclosure can include a reflector that can include one or more reflecting zones or areas that extend peripherally about axis AX. In some cases, a plurality of reflecting zones or areas can be included that extend in a radial or otherwise generally concentric relation to one another. In such cases, at least a portion or one or more of the plurality of reflecting zones can extend radially inward beyond an innermost peripheral extent of the outer side wall of the end member.

Additionally, where a plurality of reflecting zones or areas are included, the different reflecting zones can have cross-sectional profiles that extend at different angles relative to one another as well as relative to axis AX and/or a reference surface (e.g., distal edge 676). In some cases, an identifiable intersection between adjacent reflecting zones or portions thereof may be included on or along reflector 670. In the arrangement shown in FIGS. 11-15, for example, reflector 670 can include a reflecting zone 678 that can be at least partially formed by a reflector wall portion 680 and can include at least one reflecting surface 682. Reflector 670 is also shown as including a reflecting zone 684 that is disposed radially outward from reflecting zone 678. Reflecting zone 684 can be at least partially formed by a reflector wall portion 686 and can include at least one reflecting surface 688.

The one or more reflecting zones (e.g., reflecting zones 678 and 684) can include at least one reflecting surface (e.g., reflecting surfaces 682 and 688) that is capable of reflecting sensing waves from a sensing device transmitter back toward a sensing device receiver under an orientation of the end member with different reflecting surfaces being capable of reflecting the sensing waves at different orientations of the end member. In some cases, reflecting surfaces 682 and/or 688 can take the form of single, substantially continuous surfaces, such as frustoconical surfaces, for example. In other cases, reflecting surfaces 682 and/or 688 can, optionally, include a plurality of facets or discrete reflecting surface portions formed therealong, such as are represented by surface portions 682A and 688A and separated by dashed lines in FIG. 13. In such cases, at least one of reflecting surfaces 682 and/or 688 can include a plurality of discrete reflecting surface portions, such as four or more reflecting surface portions, for example. In the exemplary arrangement in FIGS. 12-14, reflecting surfaces 682 and 688 can each include twelve reflecting surface portions 682A and 688A are shown. It will be appreciated, however, that any suitable number of facets or reflecting surface portions could alternately be used. One advantage of a construction that includes a plurality of faceted or otherwise discrete surface portions that are arrayed around axis AX is that the end member can be secured to the flexible spring member without regard to the particular position or orientation of the sensing device or opposing end member of the gas spring assembly.

As discussed above, reflector 670 can include any number of two or more reflecting zones that are angularly disposed relative to a reference surface, such as distal edge 676, for example. In the exemplary arrangement shown, reflecting surface 682 of reflecting zone 678 can extend in a radially outward direction from adjacent distal edge 676 toward outermost peripheral edge 674 at a fourth included angle AG4. Additionally, reflecting surface 688 of reflecting zone 684 can extend in a radially outward direction from adjacent reflecting surface 682 of reflecting zone 678 toward outer peripheral edge 674 at a fifth included angle AG5 relative to distal edge 676. It will be appreciated that any suitable angles or ranges of angles can be used for fourth and fifth included angles AG4 and AG5. For example, the fourth included angle could be within a range of from approximately 3 degrees to approximately 84 degrees and is preferably less than the fifth included angle, which could be within a range of from approximately 6 degrees to approximately 87 degrees. In the exemplary embodiment shown in FIGS. 12-15, fourth and fifth included angles AG4 and AG5 are approximately 10 and 20 degrees, respectively.

Furthermore, the angular orientation and/or other geometric relationship between adjacent reflecting surfaces, such as reflecting surfaces 682 and 688, for example, can be at least partially defined by an included angle between two adjacent reflecting surfaces. For example, reflecting surface 688 of reflecting zone 684 can extend from along reflecting surface 682 of reflecting zone 678 at a sixth included angle AG6. It will be appreciated that any suitable angle or range of angles can be used for sixth included angle AG6. For example, the sixth included angle could be within a range of from approximately 3 degrees to approximately 84 degrees.

In one preferred arrangement of this alternate embodiment, a plurality of reflecting zones are formed along each of first and second reflecting surfaces. Additionally, the reflecting zones (e.g., 682A and/or 688A) of each reflecting surface are preferably disposed substantially adjacent one another and are uniformly distributed along the reflecting surface, such as being evenly spaced about axis AX, for example. One advantage of such an arrangement is that the reflector can be secured within the spring chamber without regard to the alignment of the uniformly distributed reflecting zones with the sensing device or other components or features. However, it will be appreciated that any other suitable arrangement or configuration of reflecting zones could alternately be use. For example, the reflecting zones could be of varying size or shape. Furthermore, the reflecting zones can be of any suitable profile or contour. For example, each of the reflecting zones could have one or more inwardly or outwardly extending curves. Alternately, in one preferred embodiment, the reflecting zones could be substantially planar or include a substantially planar portion.

A height or distance sensing device 690 is shown in FIG. 12 as being secured within spring chamber 608 along end member 602 and being secured thereto using suitable fasteners 692. Sensing device 690 can be connected to other systems and/or components of a suspension system (e.g., suspension system 100) in any suitable manner. For example, sensing device 690 can include a lead or connection 694 that can be used for such communication purposes, such as is indicated by leads 126 of control system 118 in FIG. 1, for example.

Sensing device 690 is capable of sending and receiving sensing waves WVS, as indicated by arrows SND and RCV. As such, it will be recognized that sensing device 690 includes a wave sending or transmitting portion and a wave receiving portion located within a common housing. As such, the sending and/or receiving portions can communicate data, information and/or signals corresponding to the sending and/or receiving of such sensing waves through lead 694. In an alternate arrangement, the sensing device could be disposed outside of the spring chamber, such as along the exterior of the end member, for example. In such an arrangement, an opening or passage can be provided in the end member adjacent the sensing device and the sensing waves and be transmitted and received by the sensing device through the opening or passage.

Figure 15:
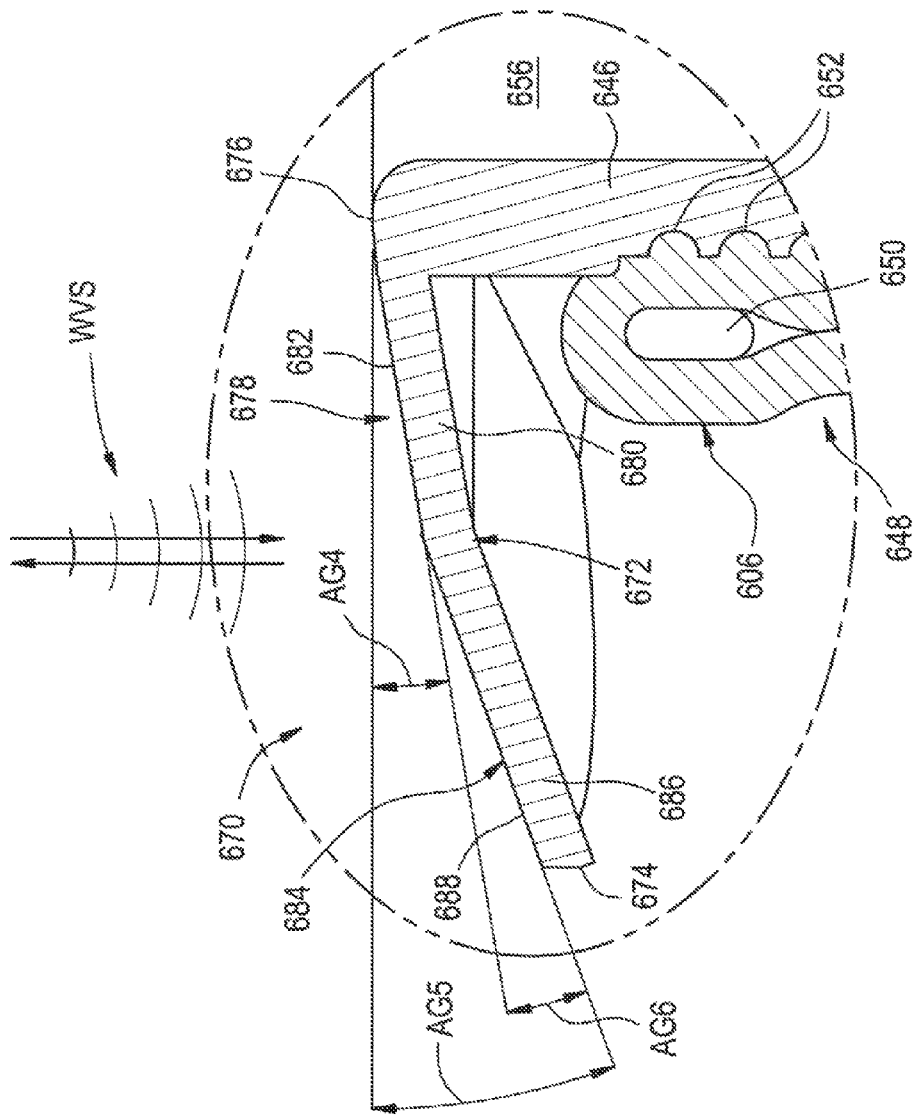
FIG. 15 is an enlarged, cross-sectional view of the portion of the gas spring assembly identified as Detail 15 in FIG. 12.

As shown in FIGS. 12 and 15, sensing waves WVS can be transmitted from sensing device 690 toward a reflector 670, as indicated by arrow SND. Reflector 670 is capable of reflecting the sensing waves back toward the sensing device to be received thereby, as indicated by arrow RCV. It will be appreciated that end member 604 is shown in FIGS. 11 and 12 as being disposed in approximate alignment with end member 602 and also in approximately transverse alignment with the direction of transmission of the sensing waves indicated by arrow SND. As such, at least a portion of the transmitted sensing waves reflect off of a target area of the reflector, such as a surface portion of distal edge 676, for example, and travel back toward the sensing device, as indicated by arrow RCV. However, as the second end member moves into a second position that is differently aligned with the first end member and the direction of transmission of the sensing waves, the target area of the reflector also becomes differently aligned, such as has been shown and described in detail in connection with FIG. 3, for example.

Additionally, it will be appreciated that gas spring assembly 600 can include any suitable number of one or more additional features, components and/or elements. For example, gas spring assembly 600 can, optionally, include a jounce bumper (not shown) disposed within the spring chamber, such as has been described above in connection with gas spring assembly 400 in FIGS. 6-10, for example.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

What is claimed is:

1. An end member dimensioned for securement to an associate flexible spring member to form an associated gas spring assembly, said end member comprising:
    a first end and a second end spaced apart from said first end such that a longitudinal axis is formed therebetween;
    a first reflecting area extending radially outward along said first end at a first included angle; and,
    a second reflecting area extending radially outward along said first end from adjacent said first reflecting area at a second included angle that is different from said first included angle such that an intersection is formed therebetween;
    at least one of said first reflecting area and said second reflecting area being faceted such that said at least one of said first reflecting area and said second reflecting area includes a plurality of reflecting surfaces circumferentially distributed about said longitudinal axis.

2. An end member according to claim 1, wherein at least one of said first and second reflecting areas has an approximately frustoconical shape.

3. An end member according to claim 1, wherein said plurality of reflecting surfaces are capable of reflecting associated sensing waves in different directions relative to one another.

4. An end member according to claim 1, wherein said plurality of reflecting surfaces are disposed uniformly about said longitudinal axis.

5. An end member according to claim 1, wherein said plurality of reflecting surfaces each include an approximately planar surface portion.

6. An end member according to claim 1, wherein said plurality of reflecting surfaces is a first plurality of reflecting surfaces, and the other of said first reflecting area and said second reflecting area includes a second plurality of reflecting surfaces.

7. An end member according to claim 6, wherein said second plurality of reflecting surfaces is uniformly distributed about said longitudinal axis.

8. An end member according to claim 1, wherein difference between said first included angle and said second included angle is within a range of from approximately 5 degrees to approximately 85 degrees.

9. An end member according to claim 1 further comprising an outer side surface extending longitudinally between said first and second end such that an associated rolling lobe of the associated flexible spring member can be formed therealong.

10. An end member according to claim 9, wherein said outer side surface has an outermost peripheral extent, and at least one of said first reflecting area and said second reflecting area extends radially outward beyond said outermost peripheral extent of said outer side surface.

11. An end member according to claim 9, wherein said outer side surface has an innermost peripheral extent, and at least one of said first reflecting area and said second reflecting area extends radially inward beyond said innermost peripheral extent of said outer side surface.

12. A gas spring assembly comprising:
    a flexible spring member having a longitudinal axis, said flexible spring member extending longitudinally between opposing first and second ends and peripherally about said axis to at least partially define a spring chamber;
    a first end member disposed across said first end of said flexible spring member and secured thereto such that a substantially fluid-tight seal is formed therebetween; and,
    a second end member spaced from said first end member, said second end member extending longitudinally between a first end and a second end spaced apart from said first end, said second end member including:
        a first reflecting area extending radially outward along said first end of said second end member at a first included angle; and,
        a second reflecting area extending radially outward along said first end of said second end member from adjacent said first reflecting area at a second included angle that is different from said first included angle such that an intersection is formed therebetween;
        at least one of said first reflecting area and said second reflecting area being faceted such that said at least one of said first reflecting area and said second reflecting area includes a plurality of reflecting surfaces circumferentially distributed about said longitudinal axis; and, a sensor disposed within said spring chamber and secured along said first end member, said sensor operative to transmit sensing waves toward and/or receive sensing waves reflected from at least one of said first reflecting area and said second reflecting area of said second end member.

13. A gas spring assembly according to claim 12, wherein said second end member includes an end surface disposed transverse to said longitudinal axis such that:

under a first orientation of said second end member, said end surface is aligned approximately transverse to a direction of transmission of the associated sensing waves; and, under a second orientation of said second end member, at least one of said plurality of reflecting surfaces of said one of said first reflecting area and said second reflecting area is aligned approximately transverse to said direction of transmission.

14. A gas spring assembly according to claim 12, wherein said second end member includes an outer side surface extending longitudinally between said first and second ends of said second end member, and said second end of said flexible spring member is secured on said second end member such that a rolling lobe formed along said flexible spring member is displaceable along said outer side surface of said second end member.

15. A gas spring assembly according to claim 12 further comprising a jounce bumper disposed within said spring chamber and secured along one of said first end member and said second end member.

16. A gas spring assembly according to claim 12, wherein said plurality of facets is a first plurality of facets, said corresponding plurality of reflecting surfaces is a first corresponding plurality of reflecting surfaces, and said reflector includes a second plurality of facets distributed circumferentially about said central axis such that the other of said first reflecting area and said second reflecting area is separated into a second corresponding plurality of reflecting surfaces.

17. A gas spring assembly according to claim 12, wherein said plurality of reflecting surfaces include substantially planar surface portions.

18. A gas spring assembly according to claim 12, wherein said plurality of reflecting surfaces are of an approximately common size and shape with respect to one another, and are uniformly spaced with respect to one another about said longitudinal axis.

19. A suspension system comprising:

at least one gas spring assembly including:
a flexible spring member having a longitudinal axis, said flexible spring member extending longitudinally between opposing first and second ends and peripherally about said axis to at least partially define a spring chamber;

a first end member disposed across said first end of said flexible spring member and secured thereto such that a substantially fluid-tight seal is formed therebetween; and, a second end member spaced from said first end member, said second end member extending longitudinally between a first end and a second end spaced apart from said first end, said second end member including:

a first reflecting area extending radially outward along said first end of said second end member at a first included angle; and, a second reflecting area extending radially outward along said first end of said second end member from adjacent said first reflecting area at a second included angle that is different from said first included angle such that an intersection is formed therebetween;

at least one of said first reflecting area and said second reflecting area being faceted such that said at least one of said first reflecting area and said second reflecting area includes a plurality of reflecting surfaces circumferentially distributed about said longitudinal axis; and, a sensor disposed within said spring chamber and secured along said first end member, said sensor operative to transmit sensing waves toward and/or receive sensing waves reflected from at least one of said first reflecting area and said second reflecting area of said second end member;

a pressurized gas system including a pressurized gas source and a control device, said pressurized gas source in fluid communication with said at least one gas spring assembly through said control device; and, a control system communicatively coupled with at least said control device and operative to selectively transfer pressurized gas into and out of said at least one gas spring assembly through said control device.

20. A gas spring assembly according to claim 12, wherein said plurality of reflecting surfaces is a first plurality of reflecting surfaces, and the other of said first reflecting area and said second reflecting area includes a second plurality of reflecting surfaces.

21. A gas spring assembly according to claim 20, wherein said first plurality of reflecting surfaces includes at least four reflecting surfaces distributed peripherally about said longitudinal axis along said first reflecting area, said second plurality of reflecting surfaces includes at least four reflecting surfaces distributed peripherally about said longitudinal axis along said second reflecting area.

* * * * *